(12) United States Patent
Togashi

(10) Patent No.: US 10,754,085 B2
(45) Date of Patent: Aug. 25, 2020

(54) LIGHTING DEVICE AND DISPLAY DEVICE

(71) Applicant: SHARP KABUSHIKI KAISHA, Sakai, Osaka (JP)

(72) Inventor: Yasuyuki Togashi, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/472,805

(22) PCT Filed: Dec. 22, 2017

(86) PCT No.: PCT/JP2017/046062
§ 371 (c)(1),
(2) Date: Jun. 21, 2019

(87) PCT Pub. No.: WO2018/128090
PCT Pub. Date: Jul. 12, 2018

(65) Prior Publication Data
US 2020/0192019 A1  Jun. 18, 2020

(30) Foreign Application Priority Data
Jan. 5, 2017  (JP) .................................. 2017-000504

(51) Int. Cl.
F21V 8/00    (2006.01)
(52) U.S. Cl.
CPC ........... *G02B 6/0068* (2013.01); *G02B 6/009* (2013.01); *G02B 6/0073* (2013.01); *G02B 6/0085* (2013.01); *G02B 6/0088* (2013.01)

(58) Field of Classification Search
CPC .... G02B 6/0068; G02B 6/009; G02B 6/0088; G02B 6/0085; G02B 6/0073
See application file for complete search history.

(56) References Cited

U.S. PATENT DOCUMENTS

2012/0206680 A1* 8/2012 Onishi ................. G02B 6/0073
349/122
2017/0038524 A1* 2/2017 Mifune ................ G02B 6/0091
2018/0321556 A1* 11/2018 Watanabe ......... G02F 1/133603

FOREIGN PATENT DOCUMENTS

JP          2015-092235 A    5/2015

* cited by examiner

*Primary Examiner* — Kevin Quarterman
(74) *Attorney, Agent, or Firm* — ScienBiziP, P.C.

(57) ABSTRACT

A lighting device 12 includes: an LED 13; an LED substrate 14 at least having an LED mounting portion 22 on which a surface of the LED 13 adjacent to a light-emitting surface 13a of the LED 13 is mounted and a first extension portion 23 extending from the LED mounting port on 22 toward a side opposite to the light-emitting surface 13a; and an LED supporting member 18 at least including an LED supporting portion 25 and a substrate contact portion 27. The LED supporting portion 25 is disposed on an opposite side from the LED substrate 14 with respect to the LED 13 and supports the LED 13 and the substrate contact portion 27 extends along a plate surface of the LED substrate 14 and is in contact with at least a part of the first extension portion 23.

13 Claims, 13 Drawing Sheets

LIGHTING DEVICE AND DISPLAY DEVICE

TECHNICAL FIELD

The present invention relates to a lighting device and a display device.

BACKGROUND ART

A known example of a conventional liquid crystal display device is disclosed in Patent Document 1 listed below. This liquid crystal display device disclosed in Patent Document 1 includes a display panel, a front cabinet, a rear cabinet, a chassis for holding a display panel, an LED substrate that constitutes an edge-emitting LED backlight, a heat sink, a backlight chassis, and a light-guiding plate supporting member. The heat sink is constituted by a substrate placement surface that is attached to a back surface of the LED substrate and a supporting member placement surface placed at a predetermined distance from a reflecting sheet. The light-guiding plate supporting member is placed in a predetermined position in a space between the supporting member placement surface and the reflecting sheet.

RELATED ART DOCUMENT

Patent Document

Patent Document 1: Japanese Unexamined Patent Application Publication No. 2015-92235

Problem to be Solved by the Invention

The liquid crystal display device disclosed in Patent Document 1 listed above is for use in a television and, as such, is structured such that the LED substrate is mounted with top-emitting LEDs. On the other hand, a liquid crystal display device for use in a mobile is required to be thin and, as such, typically includes an LED substrate mounted with side-emitting LEDs. In some cases, such side-emitting LEDs too present a problem with heat generation. However, the fact is that no effective countermeasures have been found.

DISCLOSURE OF THE PRESENT INVENTION

The present invention was made in view of the above circumstances. An object is to improve the heat dissipation characteristics of side-emitting light sources.

Means for Solving the Problem

A lighting device of the present invention includes: a light source; a light source substrate at least including a light source mounting portion on which a surface of the light source adjacent to a light-emitting surface of the light source is mounted and an extension portion extending from the light source mounting portion toward an opposite side from the light-emitting surface; and a light source supporting member at least including a light source supporting portion and a substrate contact portion. The light source supporting portion is disposed on an opposite side from the light source substrate with respect to the light source and supports the light source, and the substrate contact portion extends along a plate surface of the light source substrate and is in contact with at least a part of the extension portion.

In this way, the light source supporting member supports the light source in such a manner that the light source is sandwiched between the fight source supporting portion, disposed on the side of the light source opposite to the light source substrate, and the light source substrate. Heat generated by emission of light by the light source is transferred to the substrate contact portion, at least a part of which is brought into contact with the extension portion, of the light source supporting member via the light source mounting portion, on which the surface of the light source that is adjacent to the light-emitting surface of the light source is mounted, and the extension portion, which extends from the light source mounting portion toward the side opposite to the light-emitting surface. The substrate contact portion, which extends along the plate surface of the light source substrate, allows efficient transfer of heat from the extension portion. Heat transferred to the substrate contact portion is transferred to the light source supporting portion, whereby heat dissipation is promoted. This brings about improvement in heat dissipation characteristic of the side-emitting LED.

The following configurations are preferred as embodiments of the present invention:

(1) The lighting device may further include a contact portion supporting member at least including a contact portion supporting portion disposed on an opposite side from the extension portion with respect to the substrate contact portion and supporting the substrate contact portion. In this way, the substrate contact portion is supported in such a manner as to be sandwiched between the contact portion supporting portion of the contact portion supporting member and the extension portion. This makes it possible to favorably keep the substrate contact portion in contact with the extension portion, resulting in higher heat dissipation performance.

(2) The substrate contact portion may include substrate contact portions that are arranged at intervals along the plate surface of the light source substrate and in an orthogonal direction orthogonal to an extending direction in which the extension portion extends, and the contact portion supporting member may include a substrate supporting portion that is disposed to be laid side by side with the substrate contact portion alone the orthogonal direction and contacted with the extension portion and supports the light source substrate. In this way, the plurality of substrate contact portions, which are placed at intervals in the orthogonal direction, are brought into contact with the extension portion of the light source substrate, whereby heat from the light source is dissipated. The substrate supporting portion of the contact portion supporting member is laid side by side with the plurality of substrate contact portions, which are arranged at intervals in the orthogonal direction, along the orthogonal direction and brought into contact with the extension portion, whereby the light source substrate is supported. This makes it possible to favorably keep the plurality of substrate contact portions in contact with the extension portion. This results in higher heat dissipation performance.

(3) The substrate contact portion and the light source may be arranged along the extending direction. In this way, the distance between the light source and the substrate contact portion becomes shorter than if a substrate contact portion is placed out of alignment with the light source along the extending direction. Accordingly, heat generated from the light source is more efficiently transferred to the substrate contact portion via the light source mounting portion and the extension portion. This results in higher heat dissipation performance.

(4) The light source supporting member may include a first holding portion and a second holding portion. The first holding portion may be disposed on an opposite side from the light source substrate with respect to the substrate supporting portion and is in contact with the substrate supporting portion, and the second holding portion may extend from the first holding portion toward the light source substrate and disposed on an opposite side from the light source with respect to the substrate supporting portion in the extending direction and is in contact with the substrate supporting portion, and the substrate contact portion may be provided in such a manner as to protrude beyond the second holding portion toward the source in the extending direction. In this way, the first holding portion can hold the substrate supporting portion so that the substrate supporting portion is sandwiched between the first holding portion and the light source substrate, and the second holding portion can hold the substrate supporting portion from a side opposite to the light source in the extending direction. Since the substrate contact portion protrudes beyond the second holding portion toward the light source in the extending direction, the area of contact of the substrate contact portion with the extension portion increases as much as the substrate contact portion protrudes. This improves the efficiency of heat transfer from the extension portion to the substrate contact portion, resulting in higher heat dissipation performance.

(5) The light source supporting member may be made of sheet metal, the first holding portion and the second holding portion may be separated from the substrate contact portion, and the light source supporting member includes a linking portion extending in the orthogonal direction and joined to the substrate contact portion and the second holding portion. In this way, since the light source supporting member is made of sheet metal, the efficiency of heat transfer from the extension portion to the substrate contact portion is further improved, so that higher heat dissipation performance is attained. Heat transferred to the substrate contact portion is transferred to the second holding portion via the linking portion and then transferred to the light source supporting portion via the first holding portion, so that heat dissipation is promoted. Since the first holding portion and the second holding portion are separated from the substrate contact portion, the substrate contact portion can be formed by cutting and raising in molding the light source supporting member made of sheet metal. This makes t easier to manufacture the light source supporting member than if a substrate contact portion is formed by bending, suitably reducing manufacturing costs.

(6) The contact portion supporting member may include a secondary substrate supporting portion that is joined in such a manner as to be laid side by side with the substrate supporting portion along the extending direction and is in contact with a portion of the light source mounting portion that between the light sources that are adjacent to each other in the orthogonal direction and supports the light source substrate. In this way, the light source substrate is supported by the substrate supporting portion of the contact portion supporting member being brought into contact with the extension portion and the secondary substrate supporting portion being brought into contact with the portion of the light source mounting portion that is disposed between the light sources that are adjacent to each other in the orthogonal direction. This makes it possible to favorably keep the plurality substrate contact portions in contact with the extension portion. This results in higher heat dissipation performance.

(7) The light source may include light sources that are disposed on the light source substrate at intervals along the plate surface of the source substrate and in an orthogonal direction orthogonal to an extending direction in which the extension portion extends, and the substrate contact portion may be disposed in such a manner as to extend along the orthogonal direction while passing transversely across the light sources. In this way, the area of contact of the substrate contact portion with the extension portion of the light source substrate becomes relatively larger than in a case where a plurality of substrate contact portions are placed to be arranged at intervals in the orthogonal direction. This results in higher heat dissipation efficiency.

(8) The lighting device further includes a light-guiding plate having a plate shape including a light entrance end face that is at least one of outer peripheral end faces of the light-guiding plate and faces the light source and through which light enters and a light exit plate surface that is one of plate surfaces of the light-guiding plate and through which light exits. The light source supporting member may have a light-guiding plate supporting portion that is joined to the light source supporting portion and supports the light-guiding plate from a side opposite to the light exit plate surface. In this way, heat generated from the light source is transferred from the extension portion of the light source substrate to the substrate contact portion of the light source supporting member and then transferred to the light-guiding plate supporting portion via the light source supporting portion. The light-guiding plate supporting portion is high in heat capacity, as it supports the light-guiding plate from the side opposite to the light exit plate surface and is generally larger in area than the light source supporting portion. With this, heat from the light source is efficiently dissipated, with the result that higher heat dissipation performance is attained.

(9) The lighting device may further include a housing that accommodates at least the light source, the light source substrate, and the light source supporting member, and the housing may have a light source supporting member contact portion that is in contact with the light source supporting member. In this way, heat generated from the light source is transferred from the extension portion of the light source substrate to the light source supporting member and then transferred to the light source supporting member contact portion of the housing. The housing is high in heat capacity, as it accommodates at least the light source, the light source substrate, and the light source supporting member and is generally larger in area than the light source supporting member. With this, heat from the light source is efficiently dissipated, with the result that higher heat dissipation performance is attained.

(10) The lighting device may further include a thermally-conductive anchoring member including a base material that extends along the plate surface of the light source substrate and thermally-conductive anchoring layers provided on both sides, respectively, of the base material, the thermally-conductive anchoring member being an anchoring member interposed between the extension portion and the substrate contact portion to be anchored to both the extension portion and the substrate contact portion. In this way, the substrate contact portion is brought into contact with the extension portion via the thermally-conductive anchoring member. The thermally-conductive anchoring member, which is configured such that the thermally-conductive anchoring layers are provided on both sides, respectively, of the base material, makes it possible to efficiently transfer heat from the extension portion to the substrate contact portion. This results in higher heat dissipation performance.

(11) The light source substrate may be made of insulating resin and have a wiring pattern provided on at least a plate surface of the extension portion and made of a metal material and through which electricity is fed to the light source, and the substrate contact portion may be in contact with a portion of the extension portion where the wiring pattern is formed. In this way, the light source is lit by utilizing electric power supplied by the wiring pattern. The wiring pattern made of a metal material in the extension portion is higher in thermal conductivity than an insulating resin portion. Accordingly, heat generated from the light source is efficiently transferred to the substrate contact portion via the wiring pattern by the substrate contact portion being brought into contact with the place in the extension portion where the wiring pattern is formed. This results in higher heat dissipation performance.

Next, in order to solve the foregoing problem, a display device of the present invention includes: the lighting device described above; and a display panel that displays an image with light emitted by the lighting device. A reduction in thickness of the display device thus configured is achieved by the use of a side-emitting light source. A reduction in transmittance of the display panel along with an increase in resolution of the display panel tends to lead to a demand for an increase in luminance of the lighting device, and an increase in luminance of the lighting device leads to an increase in the amount of heat that is generated by the light source. However, sufficiently higher heat dissipation performance is attained by bringing the substrate contact portion of the light source supporting member into contact with the extension portion of the light source substrate. This makes it hard for heat to be trapped even when the amount of heat that is generated by the light source increases along with an increase in luminance of the lighting device. This suitably makes the display panel higher in resolution.

Advantageous Effect of the Invention

The present invention makes it possible to improve the heat dissipation characteristics of side-emitting light sources.

BEST MODE FOR CARRYING OUT THE INVENTION

First Embodiment

An embodiment of the present invention is described with reference to FIGS. 1 to 7. The present embodiment illustrates a liquid crystal display device 10. It should be noted that some of the drawings show an X axis, a Y axis, and a Z axis and are drawn so that the direction of each axis is an identical direction in each drawing. Further, FIG. 4 shows the front side up and the back side down.

Figure 1:
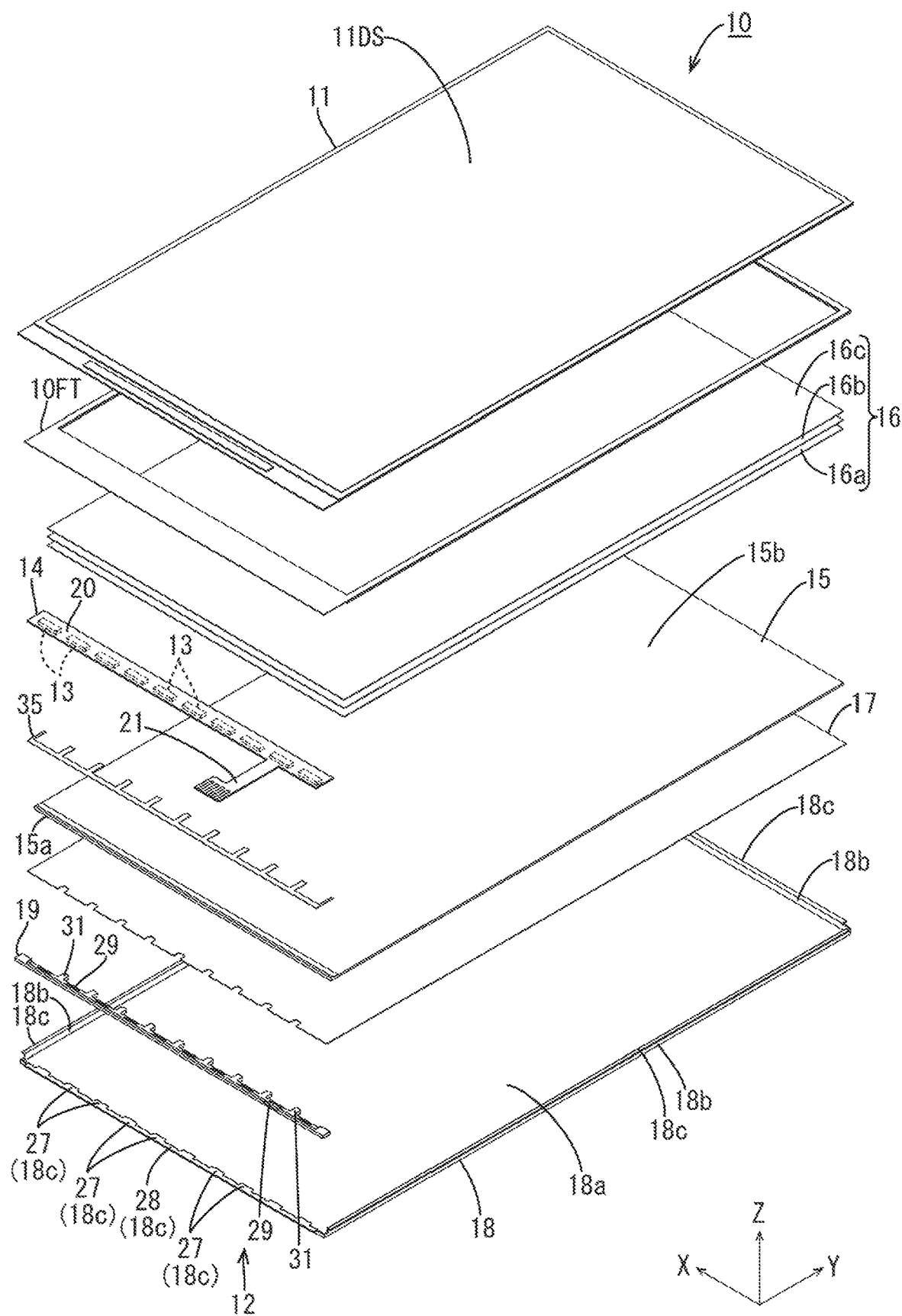
FIG. 1 is an exploded perspective view of a liquid crystal display device according to a first embodiment of the present invention.

As shown in FIG. 1, the liquid crystal display device 10 has a vertically long square shape as a whole. The liquid crystal display device 10 includes at least a liquid crystal panel (display panel) 11 having a display surface 11DS that is capable of displaying an image, a backlight device (lighting device) 12, disposed behind the liquid crystal panel 11, that serves as an external light source that illuminates the liquid crystal panel 11 with light for display, and a fixing tape 10FT for fixing together the liquid crystal panel 11 and the backlight device 12. Among these, the fixing tape 10FT has a vertically long frame shape in conformance with a frame shape of the liquid crystal display device 10 (i.e. a non-display region of the liquid crystal panel 11), and a preferred example of the fixing tape 10FT is a light blocking double-sided tape including a base material having a light blocking effect and an adhesive material applied to both sides of the base material. As shown in FIG. 4, the fixing tape 10FT has a cushioning material 10B on the back side of the light blocking double-sided tape, and the cushioning material 10B cushions an object to be fixed and makes it possible to adjust a positional relationship in a Z-axis direction. The liquid crystal display device 10 according to the present embodiment is intended to be used in a portable information terminal such as a smartphone. For this reason, the screen size of the liquid crystal panel 11 of the liquid crystal display device 10 is a size (e.g. approximately several inches) that is typically classified as a small size.

Figure 4:
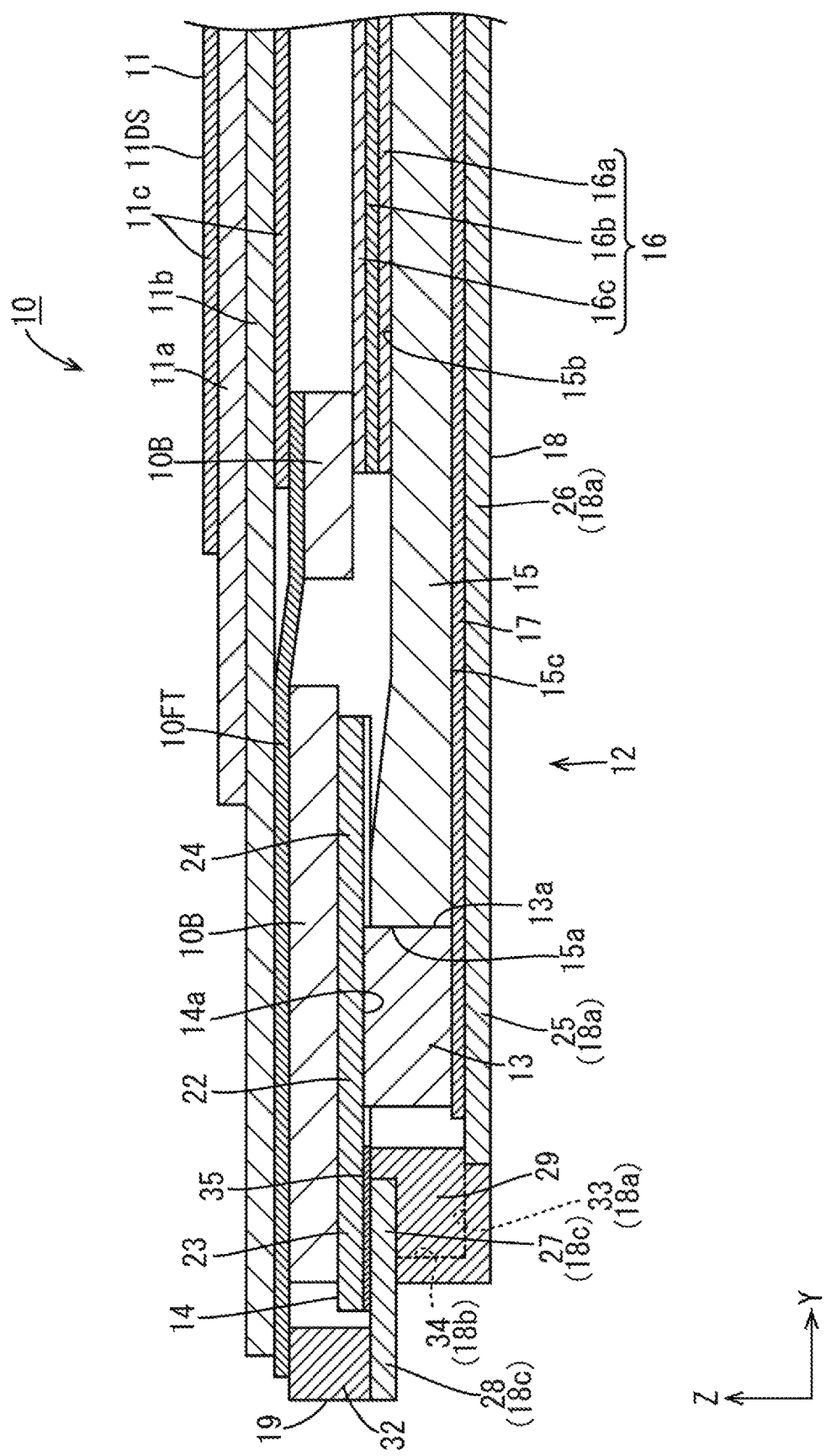
FIG. 4 is a cross-sectional view taken along line A-A in FIG. 3.

As shown in FIG. 4, the liquid crystal panel 11 includes a pair of substantially transparent glass substrates 11a and 11b bonded together with a predetermined gap therebetween and liquid crystals sealed in between the two substrates 11a and 11b. Of the pair of substrates 11a and 11b, an array substrate (active matrix substrate) 11b disposed at the back is provided with switching elements (e.g. TFTs) connected to source lines and gate lines that are orthogonal to each other, pixel electrodes connected to the switching elements, an alignment film, and the like. Further, the liquid crystal panel 11 has a display section (active area) in which an image is displayed and a non-display section (non-active area), formed in the shape of a frame that surrounds the display section, in which no image is displayed. On the other hand, a CF substrate (counter substrate) 11a disposed at the front is provided with a color filter having colored portions such as R (red) portions, G (green) portions, and B (blue) portions arranged in a predetermined array, a light blocking section (black matrix) that partitions adjacent colored portions from one another, a counter electrode, an alignment film, and the like. It should be noted that a pair of front and back polarizing plates 11c are pasted to outer surfaces of the pair of substrates 11a and 11b, respectively.

Next, the backlight device 12 is described. As shown in FIG. 1, the backlight device 12 includes at least LEDs (light-emitting diodes) 13 serving as sources, an LED substrate (light source substrate) 14 mounted with the LEDs 13, a light-guiding plate 15 that guides light from the LEDs 13, an optical sheet (optical member) 16 stacked on the front side of the light-guiding plate 15, reflecting sheet (reflecting member) 17 stacked on the back side of the light-guiding plate 15, an LED supporting member (light source supporting member) 18 that supports the LEDs 13 from the back side and that is brought into contact with a part of the LED substrate and a contact portion supporting member 19 that supports a substrate contact portion 27 of LED supporting member 18 from the back side. The backlight device 12 has its LED substrate 14 disposed at one of a pair of short side ends thereof so that the LEDs 13 mounted on the LED substrate 14 eccentrically located at one short side end of the liquid crystal panel 11. Thus, the backlight device 12 according to the present embodiment is a one-side light entrance edge-lighting (side-lighting) backlight device in which light from the LEDs 13 enters the light-guiding plate 15 only through one side. The following describes the components of the backlight device 12 in detail.

As shown in FIGS. 1 and 4, each of the LEDs 13 includes an LED chip firmly fixed onto a base member of the LED substrate 14 and a sealant sealing the LED chip. This LED 13 has an anode terminal and a cathode terminal (not illustrated), and a direct current serving as a forward bias flows between the anode terminal and the cathode terminal, whereby the LED chip emits light. The LED 13 emits white light as a whole by having its LED chip designed to monochromatically emit blue light and having its sealant dispersedly blended with phosphors (such as a yellow phosphor, a green phosphor, and a red phosphor). The LED 13 has its light-emitting surface 13a adjacent to a surface thereof mounted on the LED substrate 14. As such, the LED 13 is a so-called side-emitting light-emitting diode.

Figure 2:
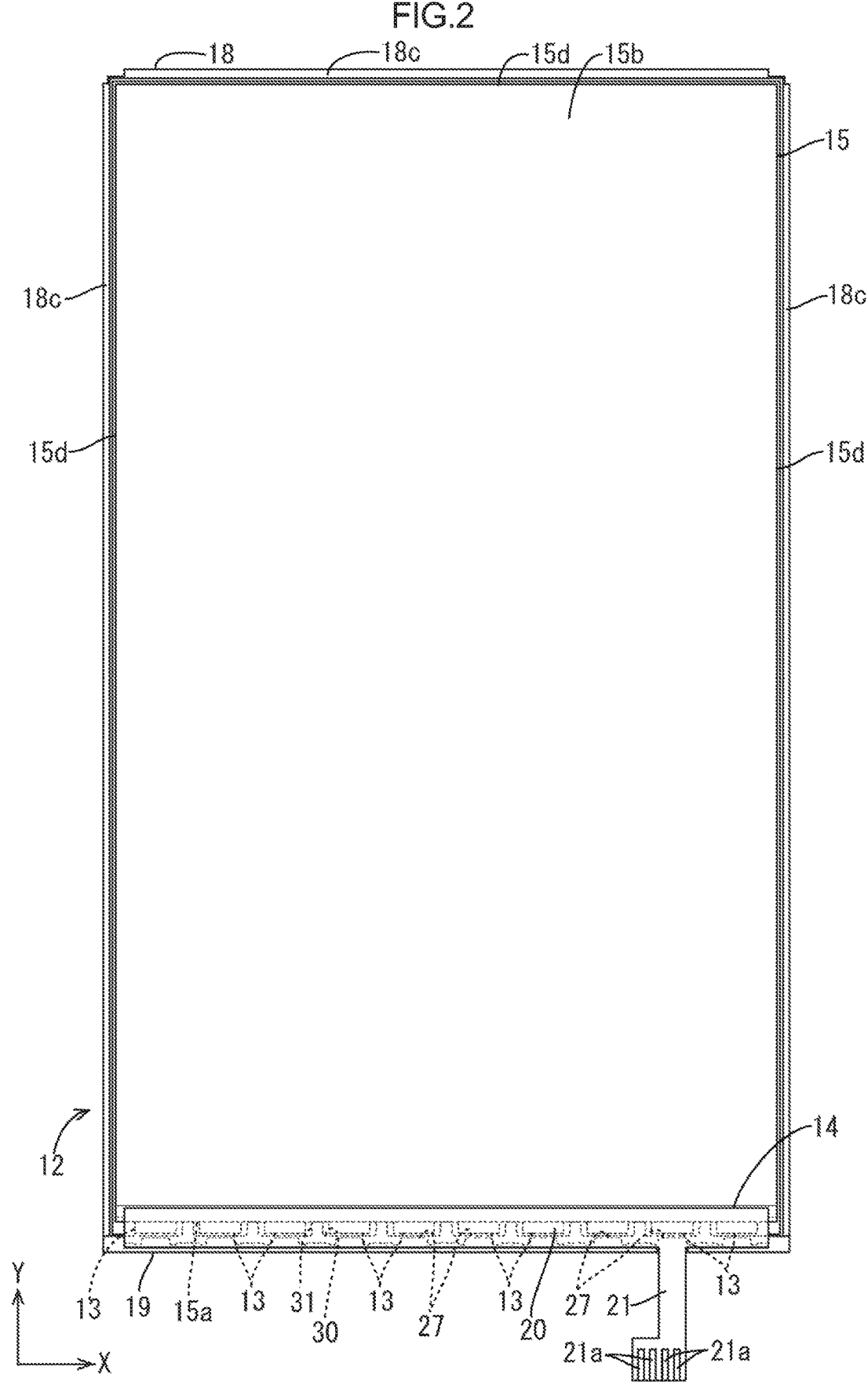
FIG. 2 is a plan view of a backlight device of the liquid crystal display device.

As shown in FIGS. 1 and 4, the LED substrate 14 is disposed in front of the LED supporting member 18 and the light-guiding plate 15, and is disposed in such a manner as to be sandwiched between the LED supporting member 18 and the liquid crystal panel 11 (fixing tape 10FT) and between the light-guiding plate 15 and the liquid crystal panel 11 (fixing tape 10FT) in the Z-axis direction. The LED substrate 14 takes the form of a flexible film (sheet) made of an insulating resin material, and has its back plate surface serving as a mounting surface 14a on which a surface (mounted surface) of the LED 13 adjacent to the light-emitting surface 13a is mounted. The mounting surface 14a of the LED substrate 14, on which the LED 13 is surface-mounted, has patterned thereon a wiring pattern (not illustrated) for feeding electricity to the LED 13. As shown in FIGS. 1 and 2, the LED substrate 14 is constituted by a substantially belt-shaped substrate body 20 having its long side direction corresponding to an X-axis direction and its short side direction corresponding to a Y-axis direction and a drawn portion 21 drawn from the substrate body 20 to the outside of the LED supporting member 18 along the Y-axis direction. The aforementioned wiring pattern is made of a metal material that is higher in electrical conductivity and thermal conductivity than a resin material, and is routed astride the substrate body 20 and the drawn portion 21.

Further, the drawn portion 21 is provided with feeding terminals 21a connected to an end of the wiring pattern, and a feeding connector (not illustrated) is connected to the feeding terminals 21a, whereby electric power is supplied from an external LED drive substrate (not illustrated).

As shown in FIG. 4, the substrate body 20 of the LED substrate 14 has an LED mounting portion (light source mounting portion) 22 on which the LED 13 is mounted, a first extension portion (extension portion, supported portion, contacted portion) 23 that extends from the LED mounting portion 22 along the Y-axis direction toward a side (i.e. toward the drawn portion 21) opposite to the light-emitting surface 13a (i.e. to the light-guiding plate 15), and a second extension portion (secondary extension portion, light-guiding plate overlap portion) 24 that extends from the LED mounting portion 22 along the Y-axis direction toward the light-emitting surface 13a (i.e. toward the light-guiding plate 15). On the LED mounting portion 22, a plurality of (in FIGS. 1 and 2, ten) the LEDs 13 are mounted in such a manner as to be arranged at intervals (intermittently) along the X-axis direction (which is a direction orthogonal to an extending direction), and the LEDs 13 are serially connected to one another by the aforementioned wiring pattern. The LEDs 13 are adjacent to one another at substantially constant array pitches. That is, it can be said that the LEDs 13 are arrayed at substantially regular intervals in the X-axis direction. The first extension portion 23 is provided with a major portion (large portion) of the wiring pattern, and the major portion of the wiring pattern is routed in such a manner as to extend along the X-axis direction (orthogonal direction) on the mounting surface 14a of the first extension portion 23, and is connected to each LED 13 en route. The second extension portion 24 is disposed in such a manner as to overlap the front side of an end (end having a light entrance end face 15a) of the light-guiding plate 15, which will be described next, that faces the LED 13, and is supported by the light-guiding plate 15 from the back side. Further, the adhesive material on the back side of the fixing tape 10FT is firmly fixed to a front (opposite to the mounting surface 14a) plate surface of the substrate body 20 of the LED substrate 14.

The light-guiding plate 15 is made of a substantially transparent synthetic resin material (e.g. acrylic resin such as PMMA, polycarbonate, or the like), and has a sufficiently higher refractive index than air. As shown in FIGS. 1 and 2, the light-guiding plate 15 has a vertically long plate shape which is similar to that of the liquid crystal panel 11, is located directly below the liquid crystal panel 11 and the optical member 16, and has its long side direction corresponding to the Y-axis direction, its short side direction corresponding to the X-axis direction, and its thickness direction corresponding to the Z-axis direction of each drawing. As shown in FIGS. 2 and 4, the light-guiding plate 15 has outer peripheral end faces including one short-side end face (bottom in FIG. 2) that serves as a light entrance end face (light source opposed end face) 15a, opposed to the LEDs 13, upon which light from the LEDs 13 falls, and the remaining three end faces (the other short-side end face and a pair of long-side end faces) serve as non-light entrance end faces (light source non-opposed end faces) 15d, not opposed to the LEDs 13, upon which the light from the LEDs 13 does not directly fall. The light entrance end face 15a runs parallel to the light-emitting surface 13a of the LED 13 and linearly extends along the X-axis direction (direction of arrangement of the LEDs 13). As shown in FIG. 4, the light-guiding plate 15 has a pair of front and back plate surfaces. That one of these plate surfaces which faces toward the front side (i.e.

toward the liquid crystal panel 11) serves as a light exit plate surface 15b that causes light to exit toward the liquid crystal panel 11, and that one of these plate surfaces which faces toward the back side serves as a light exit opposite plate surface 15c opposed to the light exit plate surface 15b. The light exit plate surface 15b runs parallel to the plate surface (display surface 11DS) of the liquid crystal panel 11, and is opposed to the plate surface of the liquid crystal panel 11 with the optical sheet 16, which will be described next, sandwiched therebetween. With such a configuration, the light-guiding plate 15 has a function of introducing, through the light entrance end face 15a, light emitted along the Y-axis direction from the LEDs 13 and, after having propagated the light inside, raising the light along the Z-axis direction causing the light to exit through the light exit plate surface 15b toward the optical member 16 (i.e. toward the front side or light exit side). Further, the end of the light-guiding plate 15 having the light entrance end face 15a has an extended range of light entrance in the Z-axis direction by having a larger plate thickness than the other portions. The end of the light-guiding plate 15 having the light entrance end face 15a has a substantially wedge-shaped cross section, and a part of the light exit plate surface 15b is inclined.

As shown in FIGS. 1 and 4, the optical sheet 16 has a vertically long plate shape which is similar no those of the liquid crystal panel 11 and the light-guiding plate 15 and has its plate surfaces running parallel to those of the liquid crystal panel 11 and the light-guiding plate 15. By being disposed in such a manner as to be in between the liquid crystal panel 11 and the light-guiding plate 15 in the Z-axis direction, the optical member 16 has a function of, while imparting a predetermined optical effect to light emitted from the light-guiding plate 15, causing the light to exit toward the liquid crystal panel 11. Specifically, the optical sheet 16 according to the present embodiment includes a three optical sheets, namely a diffusion sheet 16a, a first prism sheet 16b, and a second prism sheet 16c, in this order from the back side. The diffusion sheet 16a includes a substantially transparent base material made of synthetic resin and a large number of diffusing particles dispersed in the base material, and has a function of diffusing light that passes through the diffusion sheet 16a. The first prism sheet 16b and the second prism sheet 16c each include a substantially transparent base material made of synthetic resin and a large number of prisms, disposed on a plate surface of the base material to be arranged along the Y-axis direction or the X-axis direction, that extend along the X-axis direction or the Y-axis direction, and serve to selectively imparting a light-gathering effect to transmitted light only in a direction of arrangement of the prisms. The first prism sheet 16b and the second prism sheet 16c are placed in a such a relationship that the prisms of the first prism sheet 16b and the prisms of the second prism sheet 16c extend in directions orthogonal to each other. Further, the fixing tape 10FT is firmly fixed to the second prism sheet 16c, which is disposed at the forefront.

As shown in FIGS. 1 and 4, the reflecting sheet 17 has its plate surfaces running parallel to those of the liquid crystal panel 11 and the light-guiding plate 15, and is disposed in such a manner as to cover the light exit opposite plate surface 15c of the light-guiding plate 15. The reflecting sheet 17 presents the color of white, which is high in light reflectivity, and can efficiently raise, toward the front side (i.e. toward the light exist plate surface 15b), light leaked through the light exit opposite plate surface 15c of the light-guiding plate 15. The reflecting sheet 17 has an outer shape which is a size larger than that of the light-guiding plate 15, and has one short side end disposed in such a manner as to protrude beyond the light entrance end face 15a toward the LED 13.

The LED supporting member 18 is made of sheet metal using, for example, aluminum or the like as a metal material and, as shown in FIG. 1, has a substantially shallow box shape having an opening facing toward the front side as a whole and is capable of accommodating the LEDs 13, the LED substrate 14, the light-guiding plate 15, the optical sheet 16, the reflecting sheet 17, the contact portion supporting member 19, and the like en bloc inside. The LED supporting member 18 is constituted by a bottom plate 18a having its plate surfaces running parallel to those of the LED substrate 14 and the light-guiding plate 15, four side plates 18b rising from pairs of long-side and short-side outer ends, respectively, of the bottom plate 18a toward the front side, and four overhanging plates 18c overhanging outward from rising edges of the side plates 18b, respectively.

The bottom plate 18a of the LED supporting member 18 has a vertically long flat plate shape in plan view which is similar to that of the light-guiding plate 15 and, as shown in FIG. 4, has at least an LED supporting portion (light source supporting portion) 25, disposed behind the LED 13, i.e. on a side of the LED 13 opposite to the LED substrate 14, that supports the LED 13 and a light-guiding plate supporting portion 26, joined to the LED supporting portion 25, that supports the light-guiding plate 15 from the back side, i.e. from a side (light exit opposite plate surface 15c) opposite to the light exit plate surface 15b. The LED supporting portion 25 is constituted by one short side end of the bottom plate 18a, and supports the LEDs 13 en bloc from the back side via the reflecting sheet 17. The LEDs 13 are supported in the Z-axis direction (direction normal to the plate surfaces of the LED substrate 14) by being sandwiched between the LED substrate 14 disposed at the front and the LED substrate portion 25 disposed at the back. The light-guiding plate supporting portion 26 is constituted by a large portion of the bottom plate 18a that overlaps the light-guiding plate 15 in a plan view, and supports the light-guiding plate 15 from the back side via the reflecting sheet 17.

Figure 6:
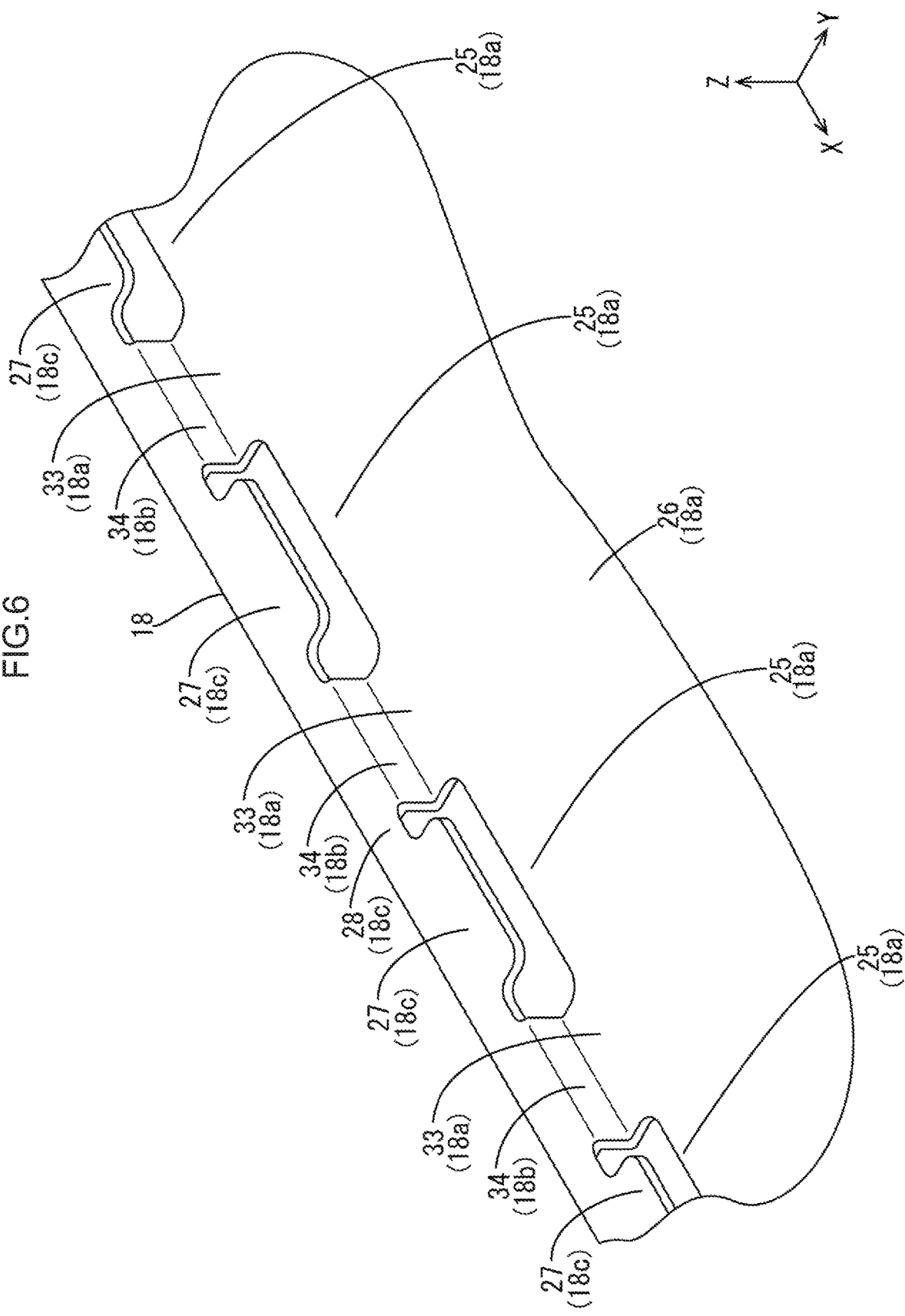
FIG. 6 is an enlarged perspective view of an LED supporting member.

Moreover, as shown in FIG. 4, the overhanging plates 18c of the LED supporting member 18 include one that has the substrate contact portion 27, which extends along a plate surface of the LED substrate 14 and which is brought into contact with at least a part of the first extension portion 23. The substrate contact portion 27 is constituted by a part of one of the four overhanging plates 18c, namely a short-side overhanging plate 18c adjacent to the LED substrate 14 that extends along the long side direction (X-axis direction) of the LED substrate 14. As shown in FIGS. 4 and 6, this overhanging plate 18c has its range of formation partially extended by partially cutting and raising the side plate 18b to which the overhanging plate 18c is joined, and the substrate contact portion 27 is constituted by this extended portion. The substrate contact portion 27 is in surface contact with the first extension portion 23 of the LED substrate 14, whereby heat generated by the emission of light by the LEDs 13 is transferred through the LED mounting portion 22 and the first extension portion 23. Heat transferred to the substrate contact portion 27 is transferred to the LED supporting portion 25 of the bottom plate 18a through the side plate 18b and further transferred to the light-guiding plate supporting portion 26, whereby heat dissipation is promoted. In particular, the light-guiding plate supporting portion 26 is high in heat dissipation performance, as it occupies a large portion of the bottom plate 18a and is much higher in heat capacity than the LED supporting portion 25. Moreover, since the substrate contact portion 27 is in contact with a place in the first extension portion 23 where the wiring pattern is formed, heat generated from the LEDs 13 is efficiently transferred to the substrate contact portion 27 via the wiring pattern made of a metal material, with the result that heat dissipation is further promoted. Further, the LED supporting member 18 is high in heat dissipation performance, as it is made of sheet metal.

As shown in FIG. 6, a plurality of the substrate contact portions 27 are disposed in such a manner as to be arranged at intervals in an extending direction of the overhanging plate 18c to which they belong, i.e. in the X-axis direction (orthogonal direction). As shown in FIGS. 1 and 4, the plurality of substrate contact portions 27 are disposed to be arranged in such a manner as to be adjacent to the plurality of LEDs 13 on the LED substrate 14 along the Y-axis direction (extending direction). That is, the plurality of substrate contact portions 27 and the plurality of LEDs 13 are disposed to be placed in alignment with each other in the X-axis direction (orthogonal direction) and arranged in front of and behind each other in the Y-axis direction. In this way, the distance from each of the LEDs 13 to a corresponding one of the substrate contact portions 27 becomes shorter than if a plurality of substrate contact portions are placed out of alignment with the plurality of LEDs 13 along the Y-axis direction (placed offset out of alignment in the X-axis direction). Accordingly, heat generated from the LEDs 13 is more efficiently transferred to the substrate contact portions 27 via the LED mounting portion 22 and the first extension portion 23, with the result that higher heat dissipation performance is attained. These substrate contact portions 27 which are arranged along the X-axis direction are linked to a linking portion 28 constituted by the remaining portions of the overhanging plate 18c. The linking portion 28 extends along the X-axis direction while passing transversely across the plurality of substrate contact portions 27, and is joined to each substrate contact portion 27 and the side plate 18b.

As shown in FIG. 1, of the four side plates 18b, which rise from the four outer peripheral sides of the bottom plate 18a, the three side plates 18b excluding the side plate 18b to which the substrate contact portions 27 belong is larger in rising dimension than the side plate 18b to which the substrate contact portions 27 belong. Moreover, three overhanging plates 18c joined to these three side plates 18b support outer ends of the liquid crystal panel 11 from the back side via the fixing tape 10FT.

The contact portion supporting member 19, which supports the substrate contact portions 27 configured as described above, is described in detail. The contact portion supporting member 19 is made of synthetic resin (e.g. made of polycarbonate) and, as shown in FIGS. 1 and 4, extends along the long side direction of the LED substrate 14 (i.e. the direction of arrangement of the plurality of LEDs 13, the direction of arrangement of the plurality of substrate contact portions 27, and the X-axis direction), and is disposed in such a manner as to be adjacent to each LED 13 on a side opposite to the light-guiding plate 15 in the Y-axis direction. That is, as shown in FIG. 4, the contact portion supporting member 19 is placed so that each LED 13 is interposed between the contact portion supporting member 19 and the light-guiding plate 15 in the Y-axis direction. Moreover, the contact portion supporting member 19 has at least a contact portion supporting portion 29, disposed on a side of the substrate contact portions 27 opposite to the first extension portion 23 of the LED substrate 14, that supports the substrate contact portions 27. With such a configuration, the substrate contact portions 27 are supported in such a manner as to be sandwiched between the contact portion supporting portion 29 of the contact portion supporting member 19 and the first extension portion 23. This makes it possible to favorably keep the substrate contact portions 27 in contact with the first extension portion 23, resulting in higher heat dissipation performance. It is preferable that the contact portion supporting member 19 be fixed to the LED supporting member 18 using an adhesive or the like.

Figure 3:
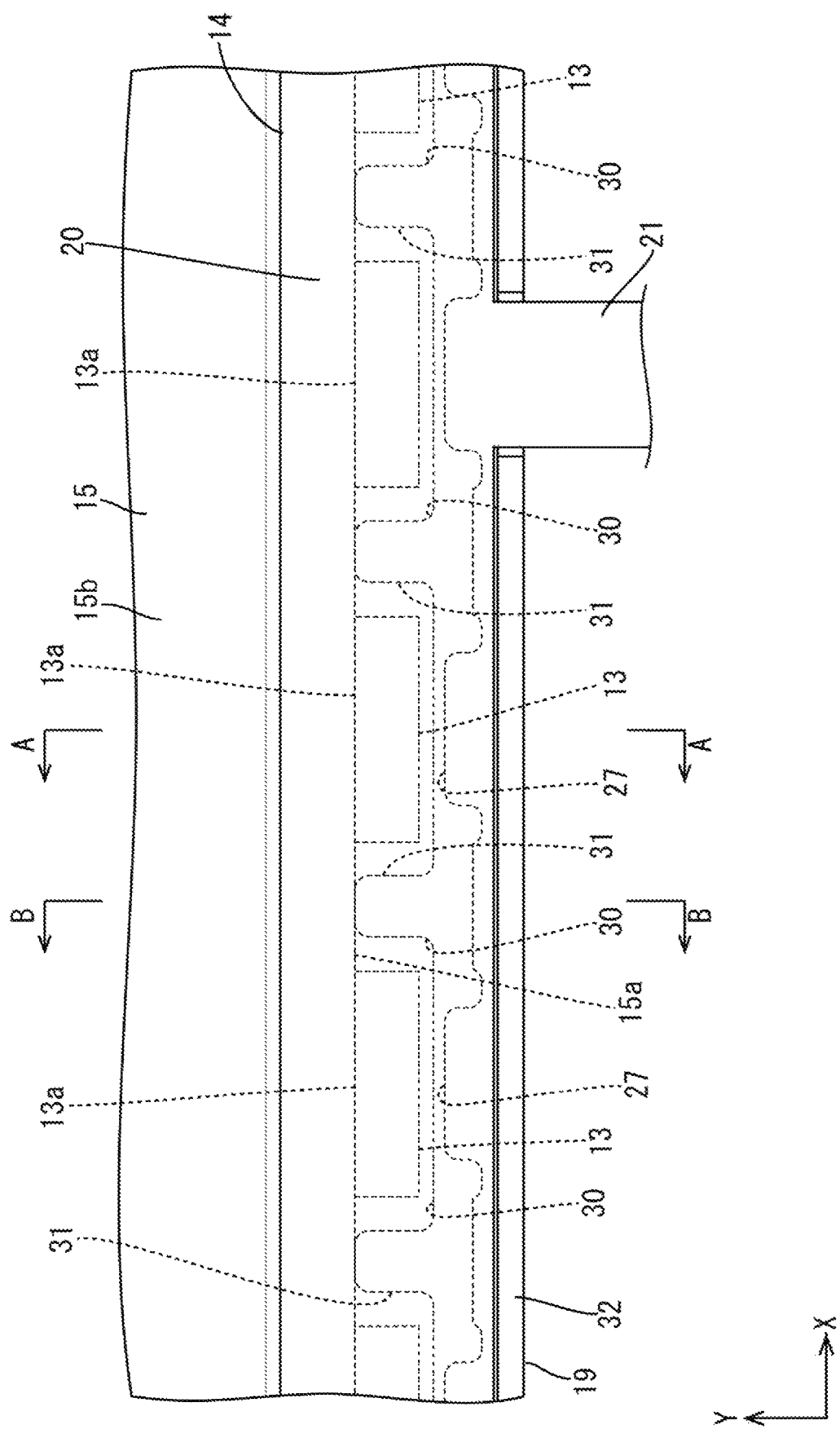
FIG. 3 is an enlarged plan view of LEDs and an area therearound of the backlight device.
Figure 5:
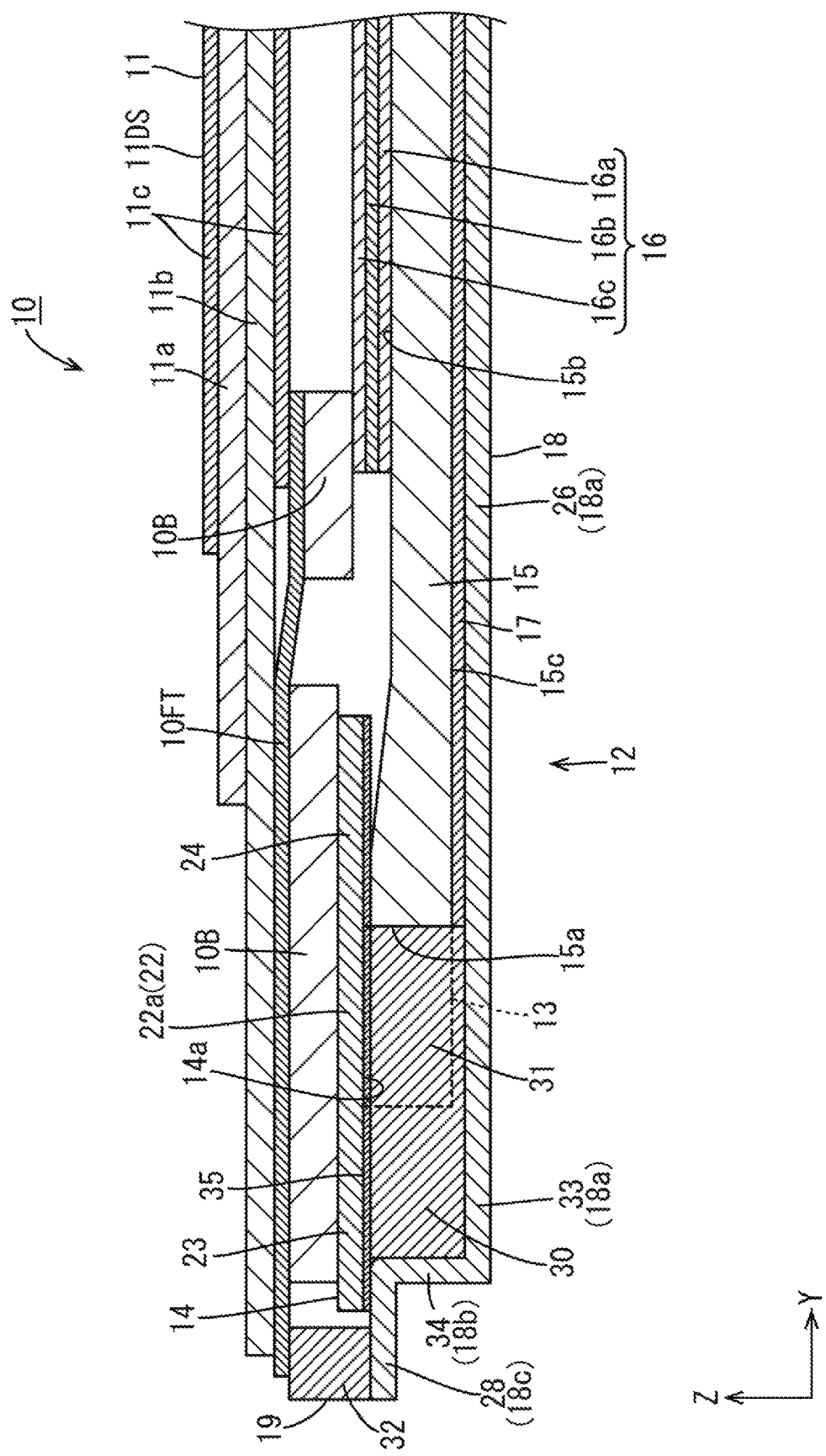
FIG. 5 is a cross-sectional view taken along line B-B in FIG. 3.
Figure 7:
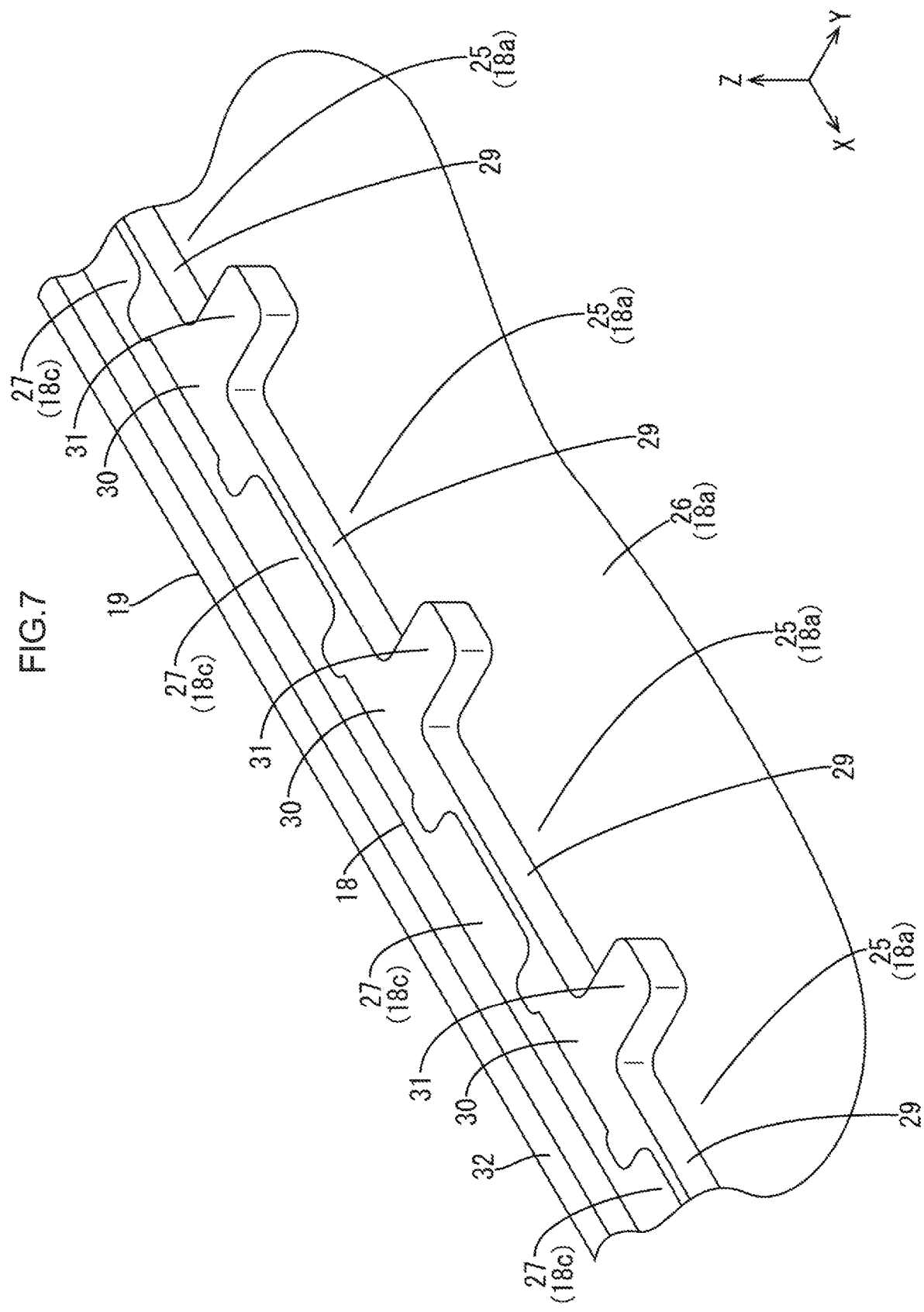
FIG. 7 is an enlarged perspective view of the LED supporting member and a contact portion supporting member.

As shown in FIGS. 3, 4, and 7, a plurality of the contact portion supporting portions 29 are disposed in such a manner as to be arranged at intervals in the X-axis direction (orthogonal direction), and are placed in such a relationship as to be aligned with the pluralities of substrate contact portions 27 and LEDs 13 in the X-axis direction. That is, it can also be said that in portions of the contact portion supporting member 19, which extends along the X-axis direction, placed in alignment with the respective substrate contact portions 27 in the X-axis direction, a plurality of grooves that receive the respective substrate contact portions 27 are provided in such a manner as to be arranged at intervals in the X-axis direction and grooves edges of these grooves serve as the contact portion supporting portions 29. As shown in FIGS. 3, 5, and 7, a portion of the contact portion supporting member 19 that is adjacent to a contact portion supporting portion 29 in the X-axis direction (laid side by side with a contact portion supporting portion 29 along the X-axis direction) serves as a first substrate supporting portion (substrate supporting portion) 30 that supports the LED substrate 14 by being brought into direct contact with the first extension portion 23. A plurality of the first substrate supporting portions 30 are disposed in such a manner as to be arranged at intervals in the X-axis direction, and are placed in such a relationship as to be out of alignment (offset) with the pluralities of substrate contact portions 27 and LEDs 13 in the X-axis direction. That is, the plurality of first substrate supporting portions 30 are disposed in such a manner as to be repeatedly arranged alternately with the pluralities of substrate contact portions 27 and LEDs 13 in the X-axis direction. The first substrate supporting portions 30 have contact surfaces that are brought into contact, with the first extension portion 23 (LED substrate 14) and that are flush with those of the substrate contact portions 27. With such a configuration, the plurality of substrate contact portions 27 and the plurality of first substrate supporting portions 30, which are arranged alternately with each other in the X-axis direction, are each brought into contact with the first extension portion 23, whereby the LED substrate 14 is supported. This makes it possible to favorably keep the plurality of substrate contact portions 27 in contact with the first extension portion 23. This results in higher heat dissipation performance.

As shown in FIGS. 3, 5, and 7, the contact portion supporting member 19 has second substrate supporting portions (secondary substrate supporting portions) 31 joined in such a manner as to be laid side by side with the first substrate supporting portions 30 along the Y-axis direction. The second substrate supporting portions 31 can support the LED substrate 14 from the back side by being brought into contact with LED in-between sections (light source in-between sections) 22a, which are portions of the LED mounting portion 22 of the LED in-between section 22a that are disposed between the LEDs 13, which are adjacent to one another in the X-axis direction. The second substrate supporting portions 31 are placed to be interposed between the LEDs 13, which are adjacent to one another in the X-axis direction, and is placed to protrude beyond the substrate contact portions 27 toward the light-guiding plate 15 in the Y-axis direction. The second substrate supporting portions 31 have contact surfaces that are brought into contact with the LED in-between sections 22a (LED substrate 14) and that are flush with those of the first substrate supporting portions 30 and the substrate contact portions 27. With such a configuration, the first extension portion 23 of the LED substrate 14 is supported by the first substrate supporting portions 30, and the LED in-between sections 22a of the LED mounting portion 22 of the LED substrate 14 is supported by the second substrate supporting portions 31. This makes it possible to favorably keep the plurality of substrate contact portions 27 in contact with the first extension portion 23. This results in higher heat dissipation performance. Moreover, as shown in FIG. 5, the second substrate supporting portions 31 have surfaces opposed to the light-guiding plate 15, and bringing these surfaces into contact with the light entrance end face 15a of the light-guiding plate 15 makes it possible to regulate elongation of the light-guiding plate 15 entailed by thermal expansion. This makes it hard for the light-guiding plate 15 to apply stress to the LEDs 13 even in a case where the light-guiding plate 15 has thermally expanded. Further, the contact portion supporting member 19 has a panel supporting portion 32, disposed nearer to the outside than the contact portion supporting portions 29 and the first substrate supporting portions 30 in the Y-axis direction and disposed at the front in the Z-axis direction, that supports the liquid crystal panel 11 from the back side. The panel supporting portion 32 is firmly fixed to one short side end of the liquid crystal panel 11 via the fixing tape 10FT. The panel supporting portion 32 is supported from the back side (side opposite to the liquid crystal panel 11) by the overhanging plates 18c (linking portions 28) of the LED supporting member 18, and is sandwiched between the overhanging plate 18c and the liquid crystal panel 11.

The contact portion supporting member 19 thus configured is held by the LED supporting member 18, and the following describe the holding structure. In particular, as shown in FIGS. 5 and 6, the bottom plate 18a of the LED supporting member 18 has a first holding portion 33, disposed behind the first substrate supporting portions 30 of the contact portion supporting member 19 (opposite to the LED substrate 14), that is brought into contact with the first substrate supporting portions 30. The first holding portion 33 holds the first substrate supporting portions 30 so that the first substrate supporting portions 30 are sandwiched between the first holding portion 33 and the LED substrate 14 in the Z-axis direction. That one of the side plates 18b of the LED supporting member 18 which faces the LED substrate 14 has a second holding portion 34, raised from the first holding portion 33 toward the front side (i.e. toward the LED substrate 14) and disposed on a side of the first substrate supporting portions 30 of the contact portion supporting member 19 opposite to the LEDs 13 (i.e. to the light-guiding plate 15) in the Y-axis direction, that is brought into contact with the first substrate supporting portions 30. The second holding portion 34 holds the first substrate supporting portions 30 from a side opposite to the LEDs 13 in the Y-axis direction.

Moreover, as shown in FIGS. 4 and 6, the substrate contact portions 27 of the LED supporting member 18 are provided in such a manner as to protrude beyond the aforementioned second holding portion 34 inward in the Y-axis direction, i.e. toward the LEDs 13. With such a configuration, the area of contact of the substrate contact portions 27 with the first extension ports on 23 increases as much as the substrate contact portions 27 protrude beyond the second holding portion 34 toward the LEDs 13. This improves the efficiency of heat transfer from the first extension portion 23 to the substrate contact portions 27, resulting in higher heat dissipation performance. Further, the aforementioned first and second holding portions 33 and 34 are separated from the substrate contact portions 27, but the second holding portion 34 is joined to the linking portion 28. With such a configuration, heat generated from the LEDs 13 and transferred to the substrate contact portions 27 is transferred to the second holding portion 34 via the linking portion 28 and then transferred to the LED supporting portion 25 and the light-guiding plate supporting portion 26 via the first holding portion 33, so that heat dissipation is promoted. Since the first holding portion 33 and the second holding portion 34 are separated from the substrate contact portions 27, the substrate contact portions 27 can be formed by cutting and raising in molding the LED supporting member 18 made of sheet metal. This makes it easier to manufacture the LED supporting member 18 than if substrate contact portions are formed by bending, suitably reducing manufacturing costs.

Further, as shown in FIGS. 1, 4, and 5, a thermally-conductive anchoring member 35 is disposed in such a manner as to be interposed between the LED supporting member 18 configured as described above and the LED substrate and between the contact portion supporting member 19 configured as described above and the LED substrate 14. The thermally-conductive anchoring member 35 has a planar shape in conformance with the contact portion supporting member 19 and has a comblike shape that extends along the X-axis direction as whole. The thermally-conductive anchoring member 35 is interposed between the substrate contact portions 27 of the LED supporting member 18 and the first extension portion 23 of the LED substrate 14 between the first substrate supporting portions 30 of the contact portion supporting member 19 and the first extension portion 23 of the LED substrate 14 and, in addition to being interposed between the second substrate supporting portions 31 of the contact portion supporting member 19 and the LED mounting portion 22 of the LED substrate 14, is also interposed between the light-guiding plate 15 and the second extension portion 24 of the LED substrate 14. Accordingly, the thermally-conductive anchoring member 35 makes it possible to fix the LED substrate 14 to the LED supporting member 18, the contact portion supporting member 19, and the light-guiding plate 15. The thermally-conductive anchoring member 35 has a base material that extends along the plate surfaces of the LED substrate 14 and thermally-conductive anchoring layers provided on both sides, respectively, of the base material (neither the base material nor the thermally-conductive anchoring layers are illustrated in detail). The base material of the thermally-conductive anchoring member 35 is constituted, for example, by a film made of synthetic resin. The thermally-conductive anchoring layers are constituted, for example, by a thermally-conductive acrylic pressure sensitive adhesive. With such a configuration, the substrate contact portions 27 of the LED supporting member 18 are brought into contact with the first extension portion 23 via the thermally-conductive anchoring member 35. Therefore, heat from the first extension portion 23 can be efficiently transferred to the substrate contact portions 27 by the thermally-conductive anchoring layers provided on both sides, respectively, of the base material of the thermally-conductive anchoring member 35. This results in higher heat dissipation performance.

As described above, a backlight device (lighting device) 12 according to the present embodiment includes: an LED (light source) 13; an LED substrate (light source substrate) 14 having at least an LED mounting portion (light source mounting portion) 22 on which a surface of the LED 13 that is adjacent to a light-emitting surface 13a of the LED 13 is mounted and a first extension portion (extension portion) 23 that extends from the LED mounting portion 22 toward a side opposite to the light-emitting surface 13a; and an LED supporting member (light source supporting member) 18 having at least an LED supporting portion (light source supporting portion) 25, disposed on a side of the LED 13 opposite to the LED substrate 14, that supports the LED 13 and a substrate contact portion 27 that extends along a plate surface of the LED substrate 14 and that is brought into contact with at least a part of the first extension portion 23.

In this way, the LED supporting member 18 supports the LED 13 in such a manner that the LED 13 is sandwiched between the LED supporting portion 25, disposed on the side of the LED 13 opposite to the LED substrate 14, and the LED substrate 14. Heat generated by emission of light by the LED 13 is transferred to the substrate contact portion 27, at least a part of which is brought Into contact with the first extension portion 23, of the LED supporting member 18 via the LED mounting portion 22, on which the surface of the LED substrate 14 that is adjacent to the light-emitting surface 13a of the LED 13 is mounted, and the first extension portion 23, which extends from the LED mounting portion 22 toward the side opposite to the light-emitting surface 13a. The substrate contact portion 27, which extends along the plate surface of the LED substrate 14, allows efficient transfer of heat from the first extension portion 23. Heat transferred to the substrate contact portion 27 is transferred to the LED supporting portion 25, whereby heat dissipation is promoted. This brings about improvement in heat dissipation characteristic of the side-emitting LED 13.

Further, the backlight device 12 further includes a contact portion supporting member 19 having at least a contact portion supporting portion 29, disposed on a side of the substrate contact portion 27 opposite to the first extension portion 23, which supports the substrate contact portion 27. In this way, the substrate contact portion 27 is supported in such a manner as to be sandwiched between the contact portion supporting portion 29 of the contact portion supporting member 19 and the first extension portion 23. This makes it possible to favorably keep the substrate contact portion 27 in contact with the first extension portion 23, resulting in higher heat dissipation performance.

Further, a plurality of the substrate contact portions 27 are provided to be arranged at intervals in an orthogonal direction parallel to the plate surface or the LED substrate 14 and orthogonal to an extending direction of the first extension portion 23, and the contact portion supporting member 19 has a first substrate supporting portion (substrate supporting portion) 30, disposed to be laid side by side with the substrate contact portion 27 along the orthogonal direction, that supports the LED substrate 14 by being brought into contact with the first extension portion 23. In this way, the plurality of substrate contact portions 27, which are placed at intervals in the orthogonal direction, are brought into contact with the first extension portion 23 of the LED substrate 14, whereby heat from the LED 13 is dissipated. The first substrate supporting portion 30 of the contact portion supporting member 19 is laid side by side with the plurality of substrate contact portions 27, which are arranged at intervals in the orthogonal direction, along the orthogonal direction and brought into contact with the first extension portion 23, whereby the LED substrate 14 is supported. This makes it possible to favorably keep the plurality of substrate contact portions 27 in contact with the first extension portion 23. This results in higher heat dissipation performance.

Further, the substrate contact portion 27 is disposed to be laid side by side with the LED 13 along the extending direction. In this way, the distance between the LED 13 and the substrate contact portion 27 becomes shorter than if a substrate contact portion is placed out of alignment with the LED 13 along the extending direction. Accordingly, heat generated from the LED 13 is more efficiently transferred to the substrate contact portion 27 via the LED mounting portion 22 and the first extension portion 23. This results in higher heat dissipation performance.

Further, the LED supporting member 18 has a first holding portion 33, disposed on a side of the first substrate supporting portion 30 opposite to the LED substrate 14, that is brought into contact with the first substrate supporting portion 30 and a second holding portion 34, raised from the first holding portion 33 toward the LED substrate 14 and disposed on a side of the first substrate supporting portion 30 opposite to the LED 13 in the extending direction, that is brought into contact with the first substrate supporting portion 30, and the substrate contact portion 27 is provided in such a manner as to protrude beyond the second holding portion 34 toward the LED 13 in the extending direction. In this way, the first holding portion 33 can hold the first substrate supporting portion 30 so that the first substrate supporting portion 30 is sandwiched between the first holding portion 33 and the LED substrate 14, and the second holding portion 34 can hold the first substrate supporting portion 30 from a side opposite to the LED 13 in the extending direction. Since the substrate contact portion 27 protrudes beyond the second holding portion 34 toward the LED 13 in the extending direction, the area of contact of the substrate contact portion 27 with the first extension portion 23 increases as much as the substrate contact portion 27 protrudes. This improves the efficiency of heat transfer from the first extension portion 23 to the substrate contact portion 27, resulting in higher heat dissipation performance.

Further, the LED supporting member 18 is made of sheet metal, has its first and second holding portions 33 and 34 separated from the substrate contact portion 27, and has a linking portion 28, joined to the substrate contact portion 27 and the second holding portion 34, that extends along the orthogonal direction. In this way, since the LED supporting member 16 is made of sheet metal, the efficiency of heat transfer from the first extension portion 23 to the substrate contact portion 27 is further improved, so that higher heat dissipation performance is attained. Heat transferred to the substrate contact portion 27 is transferred to the second holding portion 34 via the linking portion 28 and then transferred to the LED supporting portion 25 via the first holding portion 33, so that heat dissipation is promoted. Since the first holding portion 33 and the second holding portion 34 are separated from the substrate contact portion 27, the substrate contact portion 27 can be formed by cutting and raising in molding the LED supporting member 18 made of sheet metal. This makes it easier to manufacture the LED supporting member 18 than if a substrate contact portion is formed by bending, suitably reducing manufacturing costs.

Further, the contact portion supporting member 19 has a second substrate supporting portion (secondary substrate supporting portion) 31, joined in such a manner as to be laid side by side with the first substrate supporting portion 30 along the extending direction, that supports the LED substrate 14 by being brought into contact with a portion of the LED mounting portion 22 that is disposed between the LEDs 13 that are adjacent to each other in the orthogonal direction. In this way, the LED substrate 14 is supported by the first substrate supporting portion 30 of the contact portion supporting member 19 being brought into contact with the first extension portion 23 and the second substrate supporting portion 31 being brought into contact with the portion of the LED mounting portion 22 that is disposed between the LEDs 13 that are adjacent to each other in the orthogonal direction. This makes it possible to favorably keep the plurality of substrate contact portions 27 in contact with the first extension portion 23. This results in higher heat dissipation performance.

Further, the backlight device 12 further includes a light-guiding plate 15 having a plate shape, a light entrance end face 15a, constituted by at least one of outer peripheral end faces of the light-guiding plate 15, that faces the LED 13 and upon which light falls, and a light exit plate surface 15b, constituted by either of plate surfaces of the light-guiding plate 15, through which light exit, and in the backlight device 12, the LED supporting member 18 has a light-guiding plate supporting portion 26, joined to the LED supporting portion 25, that supports the light-guiding plate 15 from a side opposite to the light exit plate surface 15b. In this way, heat generated from the LED 13 is transferred from the first extension portion 23 of she LED substrate 14 to the substrate contact portion 27 of the LED supporting member 18 and then transferred to the light-guiding plate supporting portion 26 via the LED supporting portion 25. The light-guiding plate supporting portion 26 is high in heat capacity, as it supports the light-guiding plate 15 from the side opposite to the light exit plate surface 15b and is generally larger in area than the LED supporting portion 25. With this, heat from the LED 13 is efficiently dissipated, with the result that higher heat dissipation performance is attained.

Further, the backlight device 12 further includes a thermally-conductive anchoring member 35 including a base material that extends along the plate surface of the LED substrate 14 and thermally-conductive anchoring layers provided on both sides, respectively, of the base material, the thermally-conductive anchoring member 35 being an anchoring member interposed between the first extension portion 23 and the substrate contact portion 27 to be anchored to both the first extension portion 23 and the substrate contact portion 27. In this way, the substrate contact portion 27 is brought into contact with the first extension portion via the thermally-conductive anchoring member 35. The thermally-conductive anchoring member 35, which is configured such that the thermally-conductive anchoring layers are provided on both sides, respectively, of the base material, makes it possible to efficiently transfer heat from the first extension portion 23 to the substrate contact portion 27. This results in higher heat dissipation performance.

Further, the LED substrate 14 is made of insulating resin and has a wiring pattern, provided on at least a plate surface of the first extension portion 23 and made of a metal material, that feeds electricity to the LED 13, and the substrate contact portion 27 is brought into contact with a place in the first extension portion 23 where the wiring pattern is formed. In this way, the LED 13 is lit by utilizing electric power supplied by the wiring pattern. The wiring pattern made of a metal material in the first extension portion 23 is higher in thermal conductivity than an insulating resin portion. Accordingly, heat generated from the LED 13 is efficiently transferred to the substrate contact portion 27 via the wiring pattern by the substrate contact portion 27 being brought into contact with the place in the first extension portion 23 where the wiring pattern is formed. This results in higher heat dissipation performance.

Further, a liquid crystal display device (display device) 10 according to the present embodiment includes: the backlight device 12 described above; and a liquid crystal panel (display panel) 11 that displays an image with light emitted by the backlight device 12. A reduction in thickness of the liquid crystal display device 10 thus configured is achieved by the use of a side-emitting LED 13. A reduction in transmittance of the liquid crystal panel 11 along with an increase in resolution of the liquid crystal panel 11 tends to lead to a demand for an increase in luminance of the backlight device 12, and an increase in luminance of the backlight device 12 leads to an increase in the amount of heat that is generated by the LED 13. However, sufficiently higher heat dissipation performance is attained by bringing the substrate contact portion 27 of the LED supporting member 18 into contact with the first extension portion 23 of the LED substrate 14. This makes it hard for heat to be trapped even when the amount of heat that is generated by the LED 13 increases along with an increase in luminance of the backlight device 12. This suitably makes the liquid crystal panel 11 higher in resolution.

Second Embodiment

A second embodiment of the present invention is described with reference to FIG. 8. The second embodiment illustrates changes made to achieve a configuration of an LED supporting member 118 and a housing 36 added thereto. It should be noted that a repeated description of structures, actions, and effects which are similar to those of the first embodiment is omitted.

Figure 8:
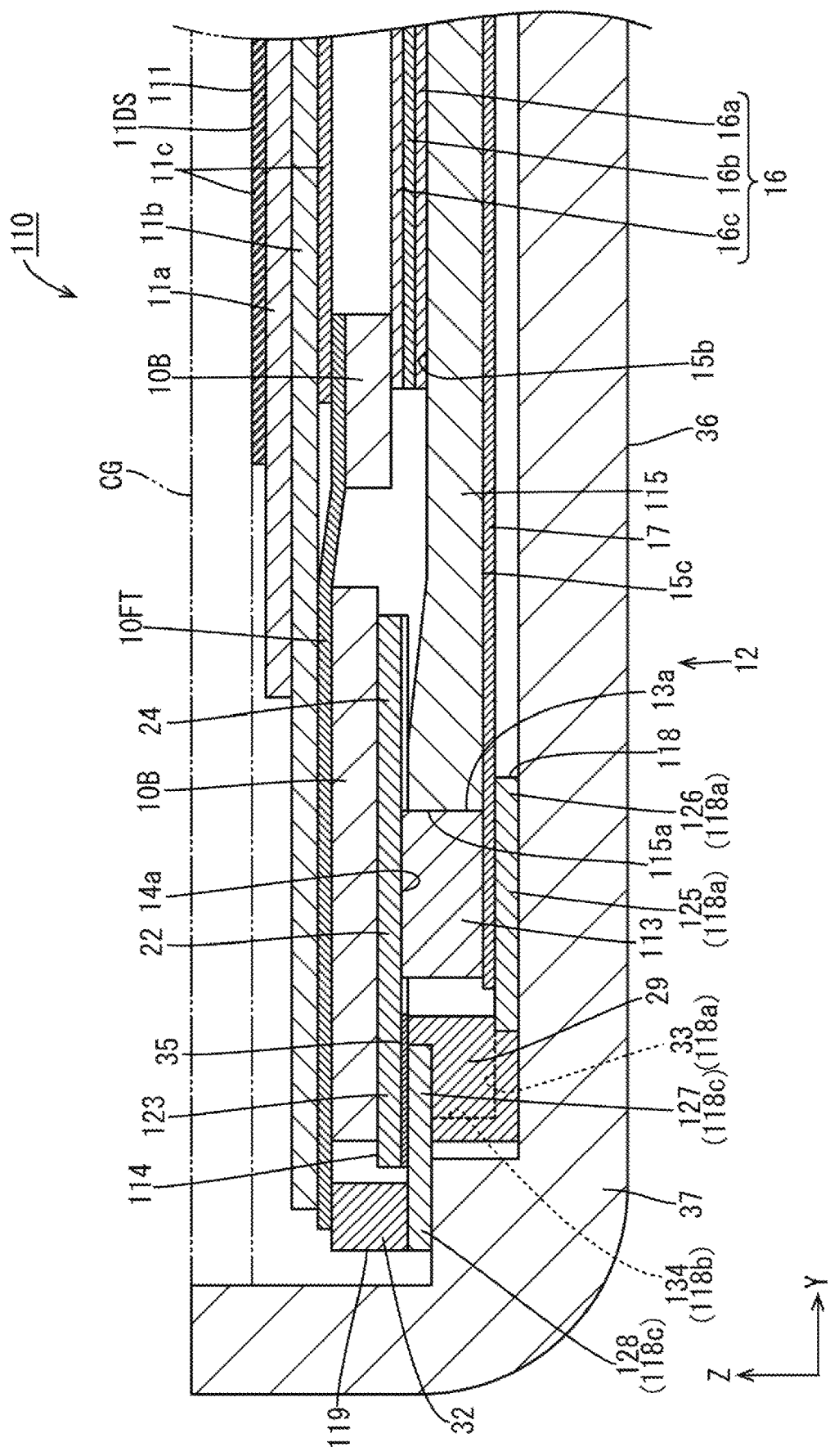
FIG. 8 is a cross-sectional view of an LED of a liquid crystal display device according to a second embodiment of the present invention.

As shown in FIG. 8, the LED supporting member 118 according to the present embodiment has a rectangular shape with a bottom plate 118a having its long side direction corresponding to the X-axis direction (orthogonal direction), and is configured to have only a side plate 118b and an overhanging plate 118c that are joined to an LED supporting portion 125. Accordingly, while the bottom plate 118a has the LED supporting portion 125, which is similar to that of the first embodiment described above, the bottom plate 118a is configured such that a light-guiding plate supporting portion 126 supports only a very small part of a light-guiding plate 115 (i.e. a part of an end that faces a light entrance end face 115a). Since the LED supporting member 118 is configured as described above, a liquid crystal display device 110 according to the present embodiment is configured to have the housing 36, which accommodates components such as LEDs 113, an LED substrate 114, the light-guiding plate 115, the LED supporting member 118, a contact portion supporting member 119, and a liquid crystal panel 111 en bloc. The housing 36 is made of metal (e.g. aluminum), has a substantially shallow box shape having an opening facing toward the front side as a whole, and accommodates the aforementioned components en bloc inside.

Moreover, the housing 36 has an LED supporting member contact portion (light source supporting member contact portion) 37 that is brought into contact with the LED supporting member 118. The LED supporting member contact portion 37 is in contact with both the bottom plate 118a (i.e. the LED supporting portion 125 and the light-guiding plate supporting portion 126) and the overhanging plate 118c (linking portion 128) of the LED supporting member 118. A port on of the LED supporting member contact portion 37 that is brought into contact with the overhanging plate 118c is brought into surface contact with a back plate surface of the overhanging plate 118c by causing a part of an inner surface of the housing 36 to protrude in a staircase pattern. With such a configuration, heat generated from the LEDs 113 is transferred from a first extension portion 123 of the LED substrate 114 to the LED supporting portion 125 and the linking portion 128 via a substrate contact portion 127 of the LED supporting member 118 and then transferred to the LED supporting member contact portion 37 of the housing 36. The housing 36 is high in heat capacity, as it accommodates the components of the liquid crystal display device 110 en bloc and is sufficiently larger in area and capacity than the LED supporting member 118. With this, heat from the LEDs 113 is efficiently dissipated, with the result that higher heat dissipation performance is attained. It should be noted that in a case where the liquid crystal display device 110 according to the present embodiment is utilized as a smartphone, it is preferable that, as indicated by chain double-dashed lines in FIG. 8, a cover glass (guard plate material) CG be stacked on the front side of the liquid crystal panel 111.

As described above, according to the present embodiment, the backlight device 12 further includes a housing 36 that accommodates at least the LED 113, the LED substrate 114, and the LED supporting member 118, and in the backlight device 12, the housing 36 has an LED supporting member contact portion (light source supporting member contact portion) 37 that makes contact with the LED supporting member 118. In this way, heat generated from the LED 113 is transferred from the first extension portion 123 of the LED substrate 114 to the LED supporting member 118 and then transferred to the LED supporting member contact portion 37 of the housing 36. The housing 36 is high in heat capacity, as it accommodates at least the LED 113, the LED substrate 114, and the LED supporting member 118 and is generally larger in area than the LED supporting member 118. With this, heat from the LED 113 is efficiently dissipated, with the result that higher heat dissipation performance is attained.

Third Embodiment

A third embodiment of the present invention is described with reference to FIGS. 9 to 11. The third embodiment illustrates changes made to the first embodiment to achieve a configuration of an LED supporting member 218. It should be noted that a repeated description of structures, actions, and effects which are similar to those of the first embodiment is omitted.

Figure 9:
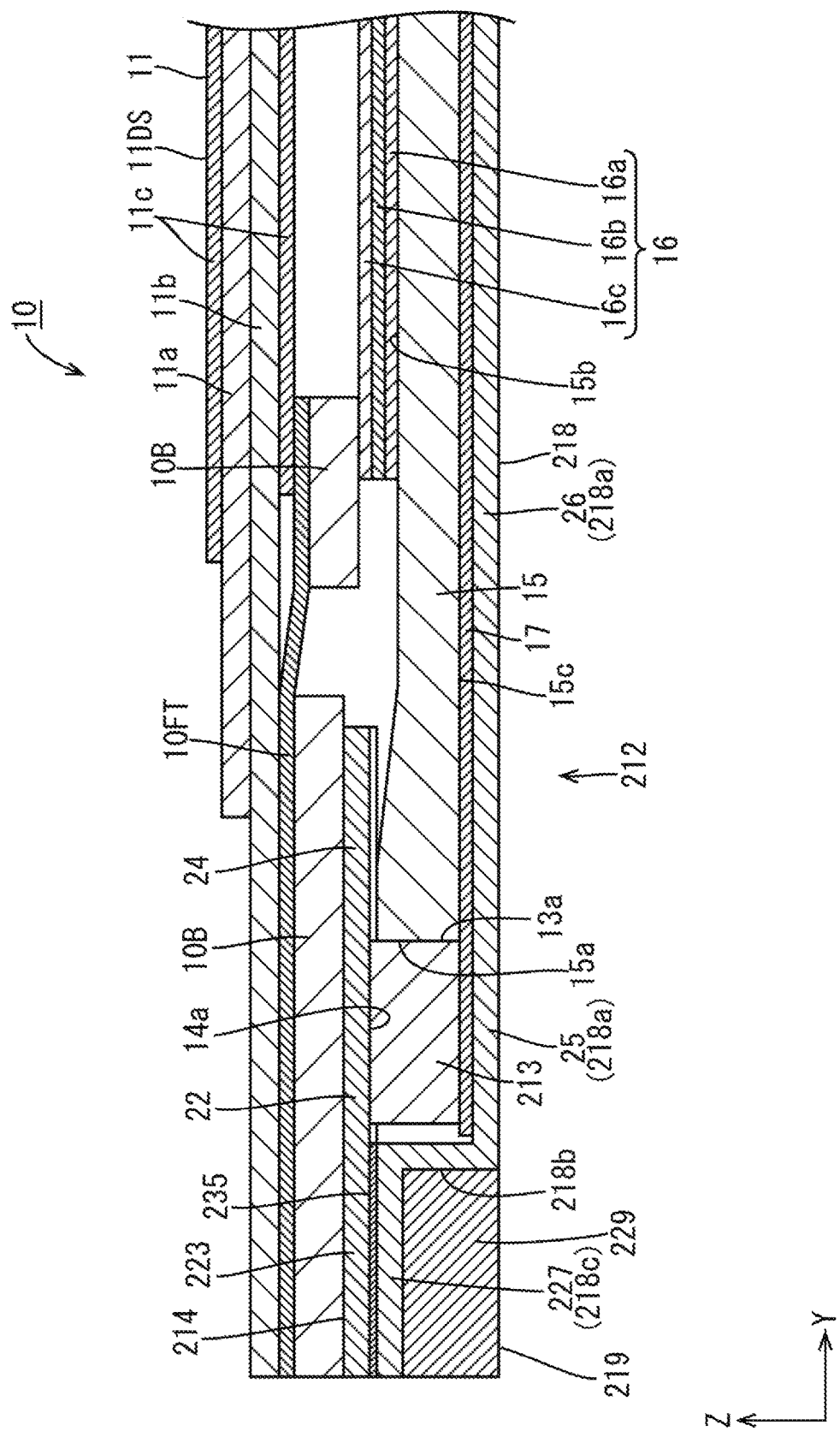
FIG. 9 is a cross-sectional view of an LED of a liquid crystal display device according to a third embodiment of the present invention.
Figure 10:
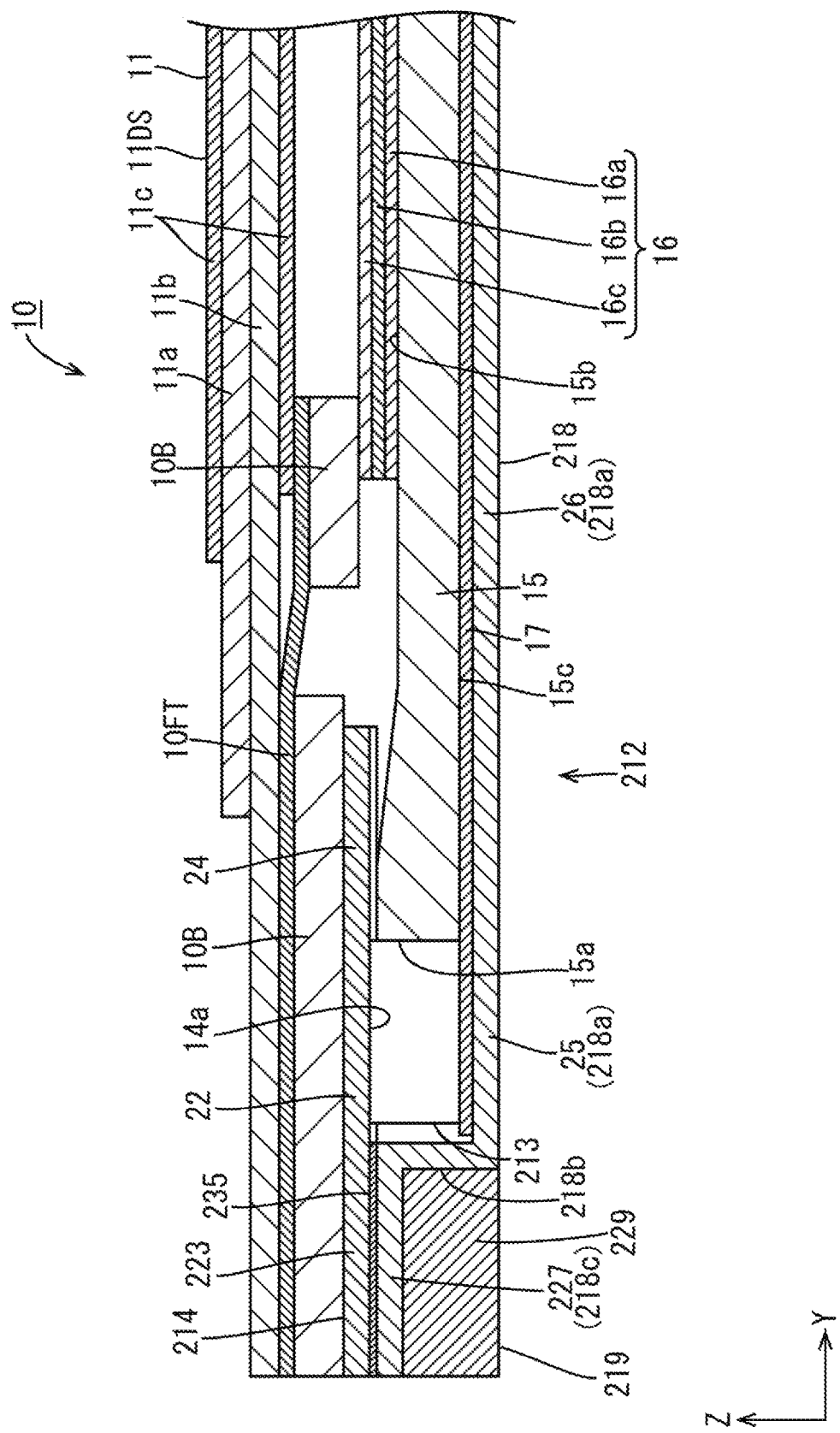
FIG. 10 is a cross-sectional view of a space between LEDs of the liquid crystal display device.
Figure 11:
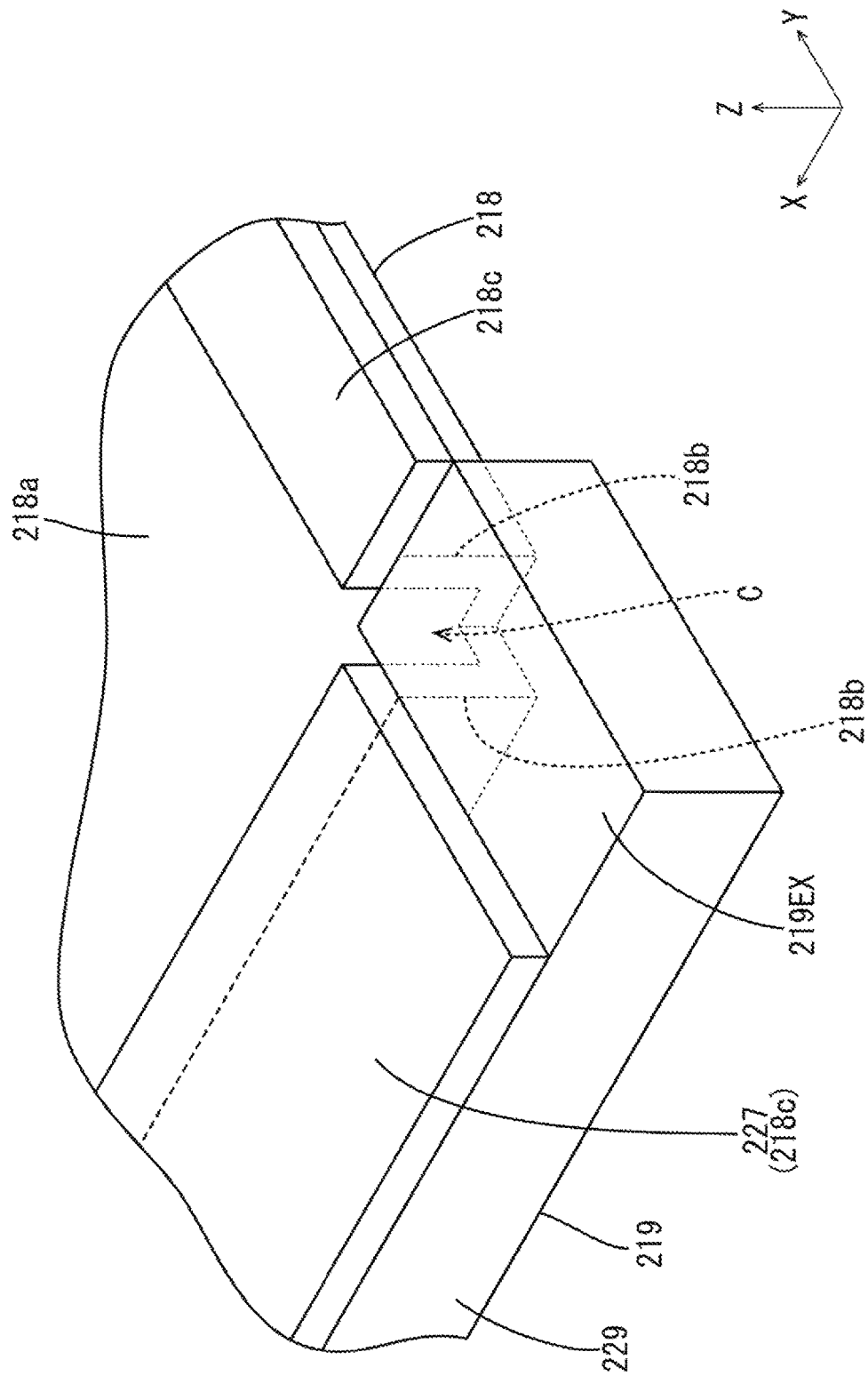
FIG. 11 is an enlarged perspective view of an LED supporting member and a contact portion supporting member.

As shown in FIGS. 9 and 10, the LED supporting member 218 according to the present embodiment is configured such that a substrate contact portion 227 extends along the X-axis direction (orthogonal direction) and is disposed in such a manner as to run parallel to an LED substrate 214 over substantially the entire length thereof. In particular, a side plate 218b rising from an end of a bottom plate 218a of the LED supporting member 218 that faces the LED substrate 214 is disposed in a location closer to an LED 213 in the Y-axis direction than that described in the first embodiment described above and has its inner surface opposed directly to the LED 213. Accordingly, an overhanging plate 218c joined to a rising edge of the side plate 218b is larger in width dimension than that described in the first embodiment described above and has its front plate surface substantially entirely in surface contact with a first extension portion 223 of the LED substrate 214 via a thermally-conductive anchoring member 235. That is, the substrate contact portion 227 is constituted substantially the entirety of the overhanging plate 218c of the LED supporting member 218 that faces the LED substrate 214, and has a portion placed in alignment with each LED 213 in the X-axis direction and a portion placed out of alignment with each LED 213 in the X-axis direction (i.e. a portion located between LEDs 213 adjacent to each other in the X-axis direction). Further, a contact portion supporting member 219 has a contact portion supporting portion 229 that extends along the X-axis direction in such a manner as to run parallel to the substrate contact portion 227 and that supports the substrate contact portion 227 substantially entirely from the back side. The contact portion supporting member 219 is in contact with the respective outer plate surfaces of the side plate 218b and the substrate contact portion 227 (overhanging plate 218c), and is disposed outside the LED supporting member 218. With such a configuration, the area of contact of the substrate contact portion 227 with the first extension portion 223 of the LED substrate 214 becomes relatively larger than in a case (FIGS. 4 and 5) where the plurality of substrate contact portions 27 are placed to be arranged at intervals in the X-axis direction as in the case of the first embodiment described above. This results in higher heat dissipation efficiency.

Each side plate 218b and each overhanging plate 218c (including the substrate contact portion 227) of the LED supporting member 218 thus configured are molded, for example, by bending (pressing). For this reason, as shown in FIG. 11, the LED supporting member 218 has a corner with a clearance C opening outward between a pair of side plates 218b rising from adjacent sides, respectively, of the bottom plate 218a. On the other hand, the contact portion supporting member 219 is extended out of the substrate contact portion 227 in the X-axis direction, and this extended portion 219EX is disposed in such a manner as to close the clearance C. This prevents the clearance C from remaining open outward, thus making it possible to prevent leakage of and prevent extraneous grit and dust from entering a backlight device 212.

As described above, according to the present embodiment, a plurality of the LEDs 213 are disposed on the LED substrate 214 to be arranged at intervals in an orthogonal direction parallel to the plate surface of the LED substrate 214 and orthogonal to an extending direction of the first extension portion 223, and the substrate contact portion 227 is disposed in such a manner as to extend along the orthogonal direction while passing transversely across the plurality of light sources 213. In this way, the area of contact of the substrate contact portion 227 with the first extension portion 223 of the LED substrate 214 becomes relatively larger than in a case where a plurality of substrate contact portions are placed to be arranged at intervals in the orthogonal direction. This results in higher heat dissipation efficiency.

Fourth Embodiment

A fourth embodiment of the present invention is described with reference to FIG. 12 or 13. The fourth embodiment illustrates changes made to the third embodiment to achieve a configuration of an LED supporting member 318. It should be noted that a repeated description of structures, actions, and effects which are similar to those of the third embodiment is omitted.

Figure 12:
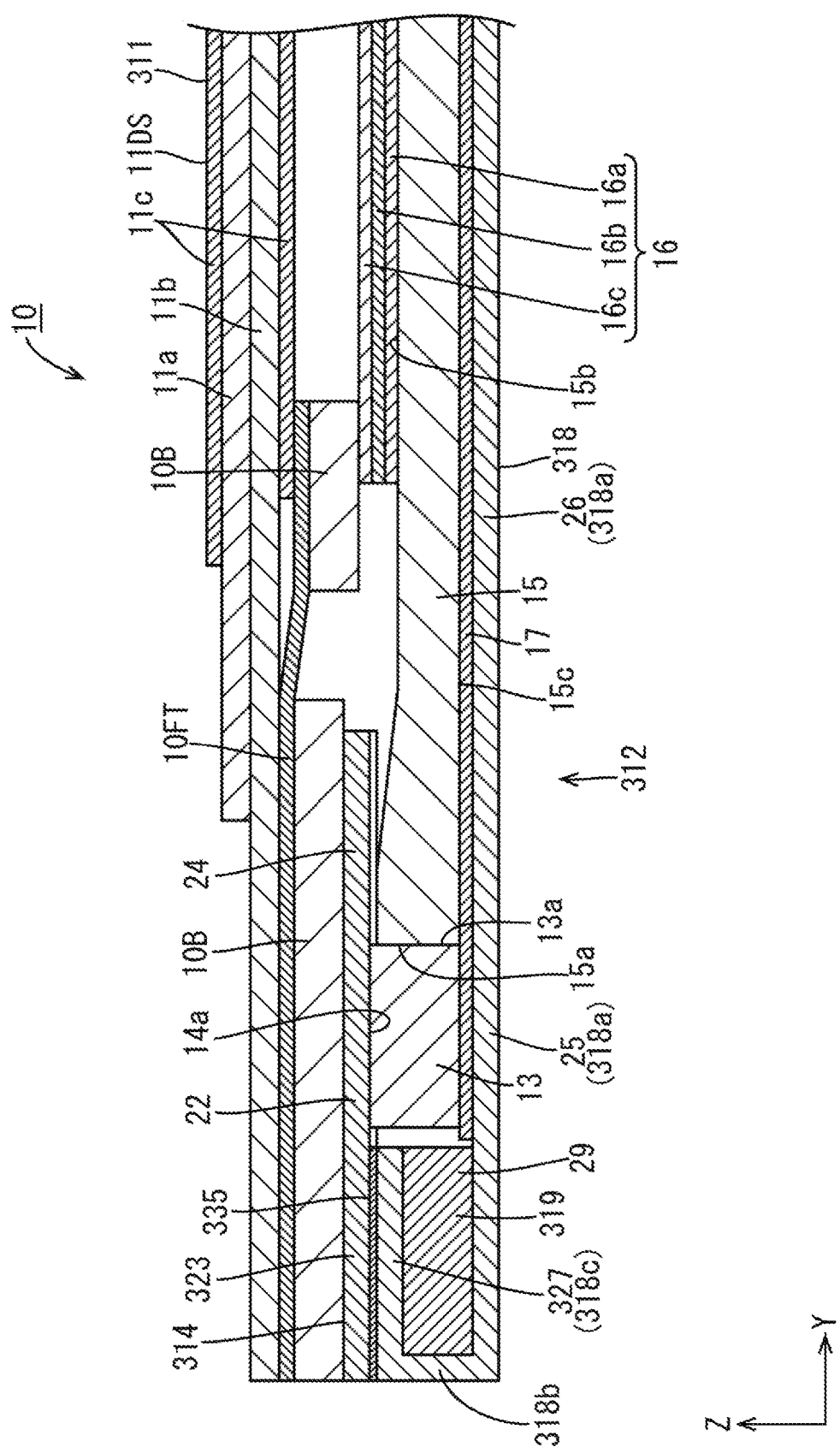
FIG. 12 is a cross-sectional view of an LED of a liquid crystal display device according to a fourth embodiment of the present invention.
Figure 13:
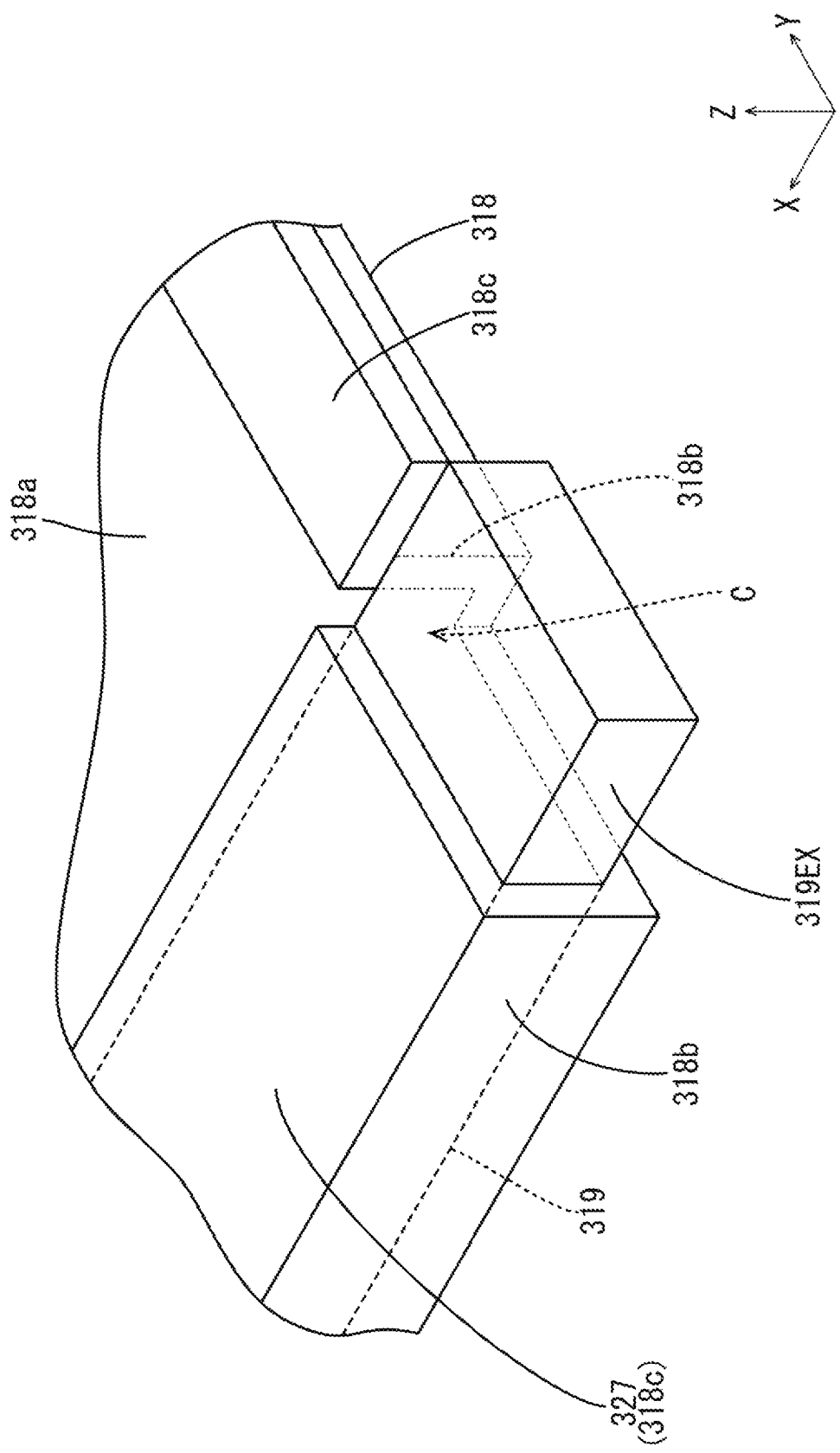
FIG. 13 is an enlarged perspective view of an LED supporting member and a contact portion supporting member.

As shown in FIG. 12, the LED supporting member 318 according to the present embodiment is configured such that an end of a bottom plate 318a that faces an LED substrate 314 is extended to reach outer ends of the LED substrate 314 and a liquid crystal panel 311. Accordingly, an overhanging plate 318c joined to a side plate 318b rising from the end of the bottom plate 318a that faces the LED substrate 314 is provided in such a manner as to protrude inward from a rising edge of the side plate 318b. The overhanging plate 318c is larger in width dimension than that described in the first embodiment described above and has its front plate surface substantially entirely in surface contact with a first extension portion 323 of the LED substrate 314 via a thermally-conductive anchoring member 335. That is, as in the case of the third embodiment described above, a substrate contact portion 327 is constituted by substantially the entirety of the overhanging plate 318c of the LED supporting member 318 that faces the LED substrate 314. Further, a contact portion supporting member 319 extends along the X-axis direction in such a manner as to run parallel to the substrate contact portion 327, is in contact with the respective inner plate surfaces of the bottom plate 318a, the side plate 318b, and the substrate contact portion 327 (overhanging plate 318c), and is accommodated inside the LED supporting member 318. Such a configuration too can bring about actions and effects which are similar to those of the third embodiment described above.

Each side plate 318b and each overhanging plate 318c (including the substrate contact portion 327) of the LED supporting member 318 thus configured are molded, for example, by bending (pressing). For this reason, as shown in FIG. 13, the LED supporting member 318 has a corner with a clearance C opening outward between a pair of side plates 318b rising from adjacent sides, respectively, of the bottom plate 318a. On the other hand, the contact portion supporting member 319 is extended out of the substrate contact portion 327 in the X-axis direction, and this extended portion 319EX is disposed in such a manner as to close the clearance C. This prevents the clearance C from remaining open outward, thus making it possible to prevent leakage of light and prevent extraneous grit and dust from entering a backlight device 312.

Other Embodiments

The present invention is not limited to the embodiments described above with reference to the drawings. The following embodiments may be included in the technical scope of the present invention.

(1) Each of the embodiments described above has illustrated a case where the LED supporting member and the contact portion supporting member are fixed with an adhesive. Alternatively, the LED supporting member and the contact portion supporting member may be fixed by manufacturing the LED supporting member and the contact portion supporting member by insert molding.

(2) While each of the embodiments described above has illustrated a case where the contact surfaces of the substrate contact portions, the first substrate supporting portions and the second substrate supporting portions with the LED substrate are flush with each other, there may be a gap between these contact surfaces. In the presence of such a gap, it is preferable to employ a configuration that absorbs the gap, for example, by imparting elasticity to the thermally-conductive anchoring member interposed between the contact surfaces and the LED substrate.

(3) Each of the embodiments described above has illustrated a case where the contact portion supporting member is in the shape of a rod that extends along the light entrance end face (long side direction of the LED substrate) of the light-guiding plate. Alternatively, the contact portion supporting member may be in the shape of a frame that extends along the outer peripheral end faces of the light-guiding plate. Alternatively, the contact portion supporting member may be in the shape of letter L or a gate that extends along two or three adjacent end faces of the outer peripheral end faces of the light-guiding plate.

(4) Each of the embodiments described above has illustrated a case where the LED supporting member, the contact portion supporting member, the light-guiding plate, and the LED substrate are fixed by interposing the thermally-conductive anchoring member between the LED supporting member and the LED substrate, between the contact portion supporting member and the LED substrate, and between the light-guiding plate and the LED substrate. Alternatively, it is also possible to use an adhesive instead of the thermally-conductive anchoring member. Similarly, it is also possible to use ah adhesive instead of the fixing tape interposed between the liquid crystal panel and the backlight device.

(5) Each of the first and second embodiments described above has illustrated a case where the substrate contact portions of the LED supporting member are placed in alignment with the LEDs in the X-axis direction. Alternatively, it is also possible to employ a configuration in which the substrate contact portions are placed out of alignment with the LEDs in the X-axis direction.

(6) Each of the first and second embodiments described above has illustrated a case where the number of substrate contact portions of the LED supporting member is equal to the number of LEDs on the LED substrate. Alternatively, it is also possible to employ a configuration in which the number of substrate contact portions of the LED supporting member is not equal to the number of LEDs on the LED substrate (i.e. a configuration in which either one of the numbers is larger or smaller than the other number).

(7) Each of the first and second embodiments described above has illustrated a case where the contact portion supporting member has the first substrate supporting portions and the second substrate supporting portions. Alternatively, it is also possible to employ a configuration in which the contact portion supporting member has the first substrate supporting portions but not the second substrate supporting portions.

(8) The second embodiment described above has illustrated a case where the LED supporting member has the light-guiding plate supporting portion. Alternatively, the LED supporting member may be placed not to overlap the light-guiding plate and be configured not to have the light-guiding supporting portion.

(9) The second embodiment described above has illustrated a case where the LED supporting member contact portion of the housing is brought into contact with the LED supporting portion, the light-guiding plate supporting portion, and the linking portion. Alternatively, the LED supporting member contact portion may be configured to be selectively brought into contact with any one or two of the LED supporting portion, the light-guiding plate supporting portion, and the linking portion.

(10) The cover glass described in the second embodiment described above may be provided with a touch panel pattern. Apart from this, a touch panel provided with a touch panel pattern may be provided separately from the cover glass.

(11) Each of the third and fourth embodiments described above has it illustrated a case where the contact portion supporting member has an extended portion that closes a clearance formed in a corner of the LED supporting member. Alternatively, in a case where leakage of light or entrance of extraneous grit and dust does not matter, it is also possible to keep the clearance open by omitting the extended portion of the contact portion supporting member. Furthermore, it is also possible to omit the contact portion supporting member per se.

(12) Each of the embodiments described above has illustrated a case where the base material of the thermally-conductive anchoring member is made of resin. Alternatively, the base material of the thermally-conductive anchoring member may be made of a metal film to have improved thermal conductivity.

(13) Each of the embodiments described above has illustrated a case where the planar shape of the liquid crystal display device (i.e. the liquid crystal panel and the backlight device) is a vertically long square. Alternatively, the planar shape of the liquid crystal display device may be a horizontally long square, a regular square, a circle, a semicircle, an oval, an ellipse, a trapezoid, or other shapes.

(14) The backlight device illustrated in each of the embodiments described above is of a one-side light entrance type in which one short-side end face of the outer peripheral end faces of the light-guiding plate serves as a light entrance end face. Alternatively, the backlight device may be of a one-side light entrance type in which any one long-side end face of the outer peripheral end faces of the light-guiding plate serves as a light entrance end face. Alternatively, the backlight device may be of two-side light entrance type in which a pair of long-side end faces or short-side end faces of the outer peripheral end faces of the light-guiding plate serve as light entrance end faces. Alternatively, the backlight device may be of a three-side light entrance type in which any three of the light-guiding plate serve as light entrance end faces or a four-side light entrance type in which all of the light-guiding plate serve as light entrance end faces.

(15) Apart from the embodiments described above, the specific number, type, and order of stacking, and the like of optical sheets that are used in the backlight device may be changed as appropriate.

(16) Apart from the embodiments described above, the reflecting sheet covering the light exit opposite plate surface of the light-guiding plate may be omitted.

(17) Apart from the embodiments described above, the number of LED substrates that are used may be changed as appropriate. Further, the number of LEDs that are mounted on the LED substrate, the array intervals between adjacent LEDs, and the like may be changed as appropriate.

(18) Each of the embodiments described above has illustrated LEDs as light sources. Alternatively, it is also possible to use light sources (such as organic EL) other than LEDs.

(19) Each of the embodiments described above has illustrated an example in which the color filter of the liquid crystal panel is composed of three colors of red, green, and blue. Alternatively, the present invention is also applicable to a liquid crystal panel including a color filter composed of four colors of red, green, blue, and yellow or white.

(20) Each of the embodiments described above has illustrated a liquid crystal panel configured such that a liquid crystal layer is sandwiched between a pair of substrates. Alternatively, the present invention is also applicable to a display panel n which functional organic molecules (medium layer) are other than sandwiched between a pair of substrates.

(21) Each of the embodiments described above has used TFTs as the switching elements of the liquid crystal panel. Alternatively, the present invention is also applicable to a liquid crystal panel including switching elements (e.g. thin-film diodes (TFDs)) other than TFTs and applicable to a black-and-white display liquid crystal panel as well as a color display liquid crystal panel.

(22) Each of the embodiments described above has illustrated a liquid crystal display device including a liquid crystal panel classified as small in size. Alternatively, the present invention is also applicable to a liquid crystal display device including a liquid crystal panel classified as small to medium in size, medium in size, or large in size (very large in size) with a screen size of, for example, 10 inches to 100 inches. In that case, the liquid crystal display device may be used in an electronic apparatus such as a television receiver, an electronic billboard (digital signage) or an electronic blackboard. Further, a liquid crystal display device including a liquid crystal panel classified as small in size may be used in a portable electronic apparatus such as a tablet laptop personal computer as well as a smartphone.

(23) Each of the embodiments described above has illustrated a liquid crystal panel as the display panel. Alternatively, the present invention is also applicable to other types of display panel (such as a MEMS (microelectromechanical systems) display panel).

EXPLANATION OF SYMBOLS 10, 110: liquid crystal display device (display device)
11, 111, 311: liquid crystal panel (display panel)
12, 212, 312: backlight device (lighting device)
13, 113, 213: LED (light source)
13a: light-emitting surface
14, 114, 214, 314: LED substrate (light source substrate)
15, 115: light-guiding plate
15a, 115a: light entrance end face
15b: light exit plate surface
18, 118, 218, 318: LED supporting member (light source supporting member)
19, 119, 219, 319: contact portion supporting member
22: LED mounting portion (light source mounting portion)
23, 123, 223, 323: first extension portion (extension portion)
24: second extension portion (secondary extension portion)
25, 125: LED supporting portion (light source supporting portion)
26, 126: light-guiding plate supporting portion.
27, 127, 227, 327: substrate contact portion
28, 128: linking portion
29, 229: contact portion supporting portion
30: first substrate supporting portion (substrate supporting portion)
31: second substrate supporting portion (secondary substrate supporting portion)
33: first holding portion
34: second holding portion
35, 235, 335: thermally-conductive anchoring member
36: Lousing
37: LED supporting member contact portion (light source supporting member contact portion)

The invention claimed is:

1. A lighting device comprising:
a light source;
a light source substrate at least including a light source mounting portion on which a surface of the light source adjacent to a light-emitting surface of the light source is mounted and an extension portion extending from the light source mounting portion toward an opposite side from the light-emitting surface; and
a light source supporting member at least including a light source supporting portion and a substrate contact portion, the light source supporting portion being disposed on an opposite side from the light source substrate with respect to the light source and supporting the light source, and the substrate contact portion extending along a plate surface of the light source substrate and being in contact with at least a part of the extension portion.

2. The lighting device according to claim 1, further comprising a contact portion supporting member at least including a contact portion supporting portion disposed on an opposite side from the extension portion with respect to the substrate contact portion and supporting the substrate contact portion.

3. The lighting device according to claim 2, wherein
the substrate contact portion includes substrate contact portions that are arranged at intervals along the plate surface of the light source substrate and in an orthogonal direction orthogonal to an extending direction in which the extension portion extends, and
the contact portion supporting member includes a substrate supporting portion that is disposed to be laid side by side with the substrate contact portion along the orthogonal direction and contacted with the extension portion and supports the light source substrate.

4. The lighting device according to claim 3, wherein the substrate contact portion and the light source are arranged along the extending direction.

5. The lighting device according to claim 3, wherein
the light source supporting member includes a first holding portion and a second holding portion, the first holding portion is disposed on an opposite side from the light source substrate with respect to the substrate supporting portion and is in contact with the substrate supporting portion, and the second holding portion extends from the first holding portion toward the light source substrate and disposed on an opposite side from the light source with respect to the substrate supporting portion in the extending direction and is in contact with the substrate supporting portion, and
the substrate contact portion is provided in such a manner as to protrude beyond the second holding portion toward the light source in the extending direction.

6. The lighting device according to claim 5, wherein the light source supporting member is made of sheet metal, the first holding portion and the second holding portion are separated from the substrate contact portion, and the light source supporting member includes a linking portion extending in the orthogonal direction and joined to the substrate contact portion and the second holding portion.

7. The lighting device according to claim 3, wherein the contact portion supporting member includes a secondary substrate supporting portion that is joined in such a manner as to be laid side by side with the substrate supporting portion along the extending direction and is in contact with a portion of the light source mounting portion that is between the light sources that are adjacent to each other in the orthogonal direction and supports the light source substrate.

8. The lighting device according to claim 2, wherein
the light source includes light sources that are disposed on the light source substrate at intervals along the plate surface of the light source substrate and in an orthogonal direction orthogonal to an extending direction in which the extension portion extends, and
the substrate contact portion is disposed in such a manner as to extend along the orthogonal direction while passing transversely across the light sources.

9. The lighting device according to claim 1, further comprising a light-guiding plate having a plate shape including a light entrance end face that is at least one of outer peripheral end faces of the light-guiding plate and faces the light source and through which light enters and a light exit plate surface that is one of plate surfaces of the light-guiding plate and through which light exits,
wherein the light source supporting member has a light-guiding plate supporting portion that is joined to the light source supporting portion and supports the light-guiding plate from a side opposite to the light exit plate surface.

10. The lighting device according to claim 1, further comprising a housing that accommodates at least the light source, the light source substrate, and the light source supporting member,
wherein the housing has a light source supporting member contact portion that is in contact with the light source supporting member.

11. The lighting device according to claim 1, further comprising a thermally-conductive anchoring member including a base material that extends along the plate surface of the light source substrate and thermally-conductive anchoring layers provided on both sides, respectively, of the base material, the thermally-conductive anchoring member being an anchoring member interposed between the extension portion and the substrate contact portion to be anchored to both the extension portion and the substrate contact portion.

12. The lighting device according to claim 1, wherein
the light source substrate is made of insulating resin and has a wiring pattern provided on at least a plate surface of the extension portion and made of a metal material and through which electricity is fed to the light source, and
the substrate contact portion is in contact with a portion of the extension portion where the wiring pattern is formed.

13. A display device comprising:
the lighting device according to claim 1; and
a display panel that displays an image with light emitted by the lighting device.

\* \* \* \* \*